US012753318B2

(12) United States Patent
Sotzing et al.

(10) Patent No.: US 12,753,318 B2
(45) Date of Patent: Oct. 6, 2026

(54) POLYCANNABINOIDS FOR COMMODITY POLYMERS AND COMMODITY ELECTRONICS

(71) Applicants: University of Connecticut, Farmington, CT (US); Purdue Research Foundation, West Lafayette, IN (US)

(72) Inventors: Gregory A. Sotzing, Storrs, CT (US); Alex Chortos, West Lafayette, IN (US); Michael Sotzing, West Lafayette, IN (US)

(73) Assignee: UNIVERSITY OF CONNECTICUT, Farmington, CT (US)

( * ) Notice: Subject to any disclaimer, the term of this patent is extended or adjusted under 35 U.S.C. 154(b) by 0 days.

(21) Appl. No.: 18/907,062

(22) Filed: Oct. 4, 2024

(65) Prior Publication Data

US 2025/0122395 A1 Apr. 17, 2025

Related U.S. Application Data

(60) Provisional application No. 63/587,783, filed on Oct. 4, 2023.

(51) Int. Cl.
*C09D 11/52* (2014.01)
*C08G 63/547* (2006.01)
*H01B 1/22* (2006.01)

(52) U.S. Cl.
CPC ............ *C09D 11/52* (2013.01); *C08G 63/547* (2013.01); *H01B 1/22* (2013.01); *C08G 2230/00* (2013.01)

(58) Field of Classification Search
CPC ...... C08F 236/20; C08F 236/22; C09D 11/52; H01B 1/22; C08G 63/547
USPC .......................................................... 252/512
See application file for complete search history.

(56) References Cited

U.S. PATENT DOCUMENTS

| | | | |
|---|---|---|---|
| 8,741,317 | B2 | 6/2014 | Uhrich et al. |
| 2005/0074408 | A1 | 4/2005 | Makriyannis et al. |
| 2008/0014170 | A1 | 1/2008 | Hnojewyj et al. |
| 2009/0036523 | A1 | 2/2009 | Stinchcomb et al. |
| 2014/0329895 | A1 | 11/2014 | Riggs-Sauthier et al. |
| 2015/0159082 | A1 | 6/2015 | Lee et al. |
| 2015/0344618 | A1 | 12/2015 | Nicholson |
| 2017/0172977 | A1 | 6/2017 | Kleidon et al. |
| 2018/0271827 | A1 | 9/2018 | Heimark et al. |
| 2021/0052494 | A1 | 2/2021 | Flemmens |
| 2021/0322365 | A1 | 10/2021 | Sotzing |
| 2024/0336833 | A1 | 10/2024 | Sotzing |
| 2025/0043215 | A1 | 2/2025 | Sotzing et al. |
| 2025/0090556 | A1 | 3/2025 | Sotzing et al. |

FOREIGN PATENT DOCUMENTS

GB 621102 A 4/1949

OTHER PUBLICATIONS

Zheng "A cannabidiol-containing alginate based hydrogel as novel multifunctional wound dressing for promoting wound healing." Biomaterials Advances 134 (2022) 112560 (Year: 2022).*

(Continued)

*Primary Examiner* — Tri V Nguyen
(74) *Attorney, Agent, or Firm* — CANTOR COLBURN LLP

(57) ABSTRACT

Disclosed herein are polycannabinoids compositions which find use as a commodity polymer and for commodity electronics.

12 Claims, 7 Drawing Sheets

(56) References Cited

OTHER PUBLICATIONS

U.S. Appl. No. 19/183,058, filed Apr. 18, 2025; Inventors Gregory A. Sotzing, Pragati Rout, Lakshmi S. Nair, and Erick Orozco; Applicant University of Connecticut; Title Coadministration of Polycannabinoid With Amine/Amide Anesthetics to Enhance Efficacy Against Pain.
Weiner et al. "Monomers and polymers of delta1(6)-tetrahydrocannabinol and cannabidiol" European Journal of Medicinal Chemistry vol. 10, No. 1, 79-83, 1975.
Borrelli, Biochemical Pharmacology, 85, 2013 (Year 2013.
Bowd et al. Photochemical Transformations of Cannabinol J.C.S. Chem Comm (1975) 797-798.
Daniels et al., "Poly(cannabinoid)s: Hemp-Derived Biocompatible Thermoplastic Polyesters with Inherent Antioxidant Properties" , ACS Applied Materials & Interfaces, Nov. 21, 2022.
Delong, Drug Alcohol Depend, 112, 1-2, 2010 (Year 2010).
Harris, European Polymer Journal, 120, 2019 (Year 2019).
Malone, BJP, 162,2011 (Year 2011).
Martin-Fontecha et al. A Fluorescent Probe to Unravel Functional Features of Cannabinoid Receptor CB1 in Human Blood and Tonsil Immune System Cells Bioconjugate Chem. (2018), 29, 2, 382-389.
Morales, Paula et al.; "An Overview on Medicinal Chemistry of Synthetic and Natural Derivatives of Cannabidiol"; Frontiers in Pharmacology, V. 8, Article 422, Jun. 2017, p. 1-18.
PubChem et al., Substance Record for SID 440246656. Modify Date: Feb. 21, 2021 [retrieved on Sep. 18, 2024] Retrieved from the Internet: <URL; https://pubchem.ncbi.nlm.nih.gov/sustance/440246656>.entire document, Substance Record for SID 440246656. Modify Date: Feb. 21, 2021 [retrieved on Sep. 18, 2024] Retrieved from the Internet: <URL; https://pubchem.ncbi.nlm.nih.gov/sustance/440246656>.entire document.
Sarott et al. Development of High-Specificity Fluorescent Probes to Enable Cannabinoid Type 2 Receptor Studies in Living Cells, J. Am. Chem. Soc. (2020) 142, 40, 16953-16964.
Sotzing, UCONN Research—Composite Materials Including Polycannabinoids; Published online Nov. 30, 2023, 2 pages; accessed Apr. 5, 2024.
Sotzing, UCONN Research—Natural and Synthetic Cannabinoids as Fluorescent Drugs; Composition, Methods, and Application; Published online Nov. 30, 2023, 2 pages; accessed Apr. 5, 2024.
Wang et al. "Poly(Glycerol Sebacate) in Tissue Engineering and Regenerative Medicine", Material Matters, 2016, 11.3; 13 pages.
U.S. Appl. No. 19/235,244, filed Jun. 11, 2025; Inventor Gregory Allen Sotzing; Applicant University of Connecticut; Title Polycannabinoids, Compounds, Compositions and Methods of Use.
U.S. Appl. No. 19/395,511, filed Nov. 20, 2025; Inventor Gregory Allen Sotzing; Applicant University of Connecticut; Title Polycannabinoids, Compounds, Compositions and Methods of Use.

* cited by examiner

POLYCANNABINOIDS FOR COMMODITY POLYMERS AND COMMODITY ELECTRONICS

CROSS-REFERENCE TO RELATED APPLICATIONS

This disclosure claims the benefit of U.S. Provisional Application No. 63/587,783, filed Oct. 4, 2023, the contents of which are hereby incorporated by reference in its entirety for all purposes.

TECHNICAL FIELD

The invention disclosed herein relates to polymeric materials, and in particular to metallic polycannabinoid compositions.

BACKGROUND

A variety of technologies make use of conductive materials for specialized applications. For example, various medical technologies benefit from use of materials that are substantially flexible, biodegradable, and also conductive. Unfortunately, such combinations of materials are often hard to identify.

Consider also the substantial problem of waste electronics, or "e-waste." Many common devices, such as personal computers, cell-phones and the like, remain physically robust long after becoming obsolete and essentially useless. The mounting problem of e-waste is not easily addressed. A number of attempts to address e-waste have been made. Quite commonly, these efforts require aggregation and transportation to central facilities that use substantial equipment and many personnel for disassembly and material recovery. In short, substantial resources are required to reduce the impact of e-waste.

There remains a need in the art for new materials that are naturally biodegradable and conductive, where the materials may be tuned to exhibit a variety of properties, such as those of numerous polymeric materials. Furthermore, the materials must also be inexpensive to produce and use in fabrication of devices in order to be useful in a variety of devices.

SUMMARY

Disclosed herein are compositions of polycannabinoids. Generally, the compositions provide polymeric materials in combination with metallic components. The compositions enable a variety of technologies, and are particularly useful in the medical arts.

Disclosed, in various embodiments, are compositions comprising: a metal, a MXene, or a combination thereof, and a polycannabinoid; wherein the polycannabinoid comprises a plurality of cannabinoid units, wherein the polycannabinoid has the formula:

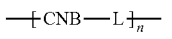 or 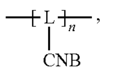, wherein: CNB is a cannabinoid unit, L is a linking group; and n represents the number of repeat units wherein n is at least 2; wherein the linking group comprises a di- or tri-carboxylic acid linking group comprising citric acid, fumaric acid, glutamic acid, maleic acid, malic acid, terephthalic acid, isophthalic acid, naphthalene-2,6-dicarboxylic acid, oxaloacetic acid, phthalic acid, butanedioic acid, oxalic acid, malonic acid, succinic acid, glutaric acid, adipic acid, pimelic acid (heptanedioic acid), suberic acid (octanedioic acid), azelaic acid (nonanedioic acid), sebacic acid (decanedioic acid), undecanedioic acid, dodecanedioic acid, pyridine-2,6-dicarboxylic acid, 1H-imidazole-4,5-dicarboxylic acid, furan-2,5-dicarboxylic acid, furan-2,3-dicarboxylic acid, thiophene-2,5-dicarboxylic acid, thiophene-2,3-dicarboxylic acid, quinoline-2,4-dicarboxylic acid, cyclohexane-1,4-dicarboxylic acid, cyclopentane-1,3-dicarboxylic acid, cyclobutane-1,3-dicarboxylic acid, or bicyclo[2.2.2]octane-1,4-dicarboxylic acid, or a bifunctional compound such as

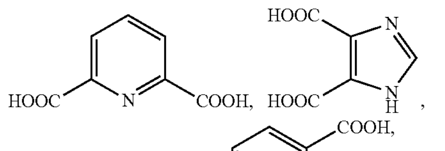

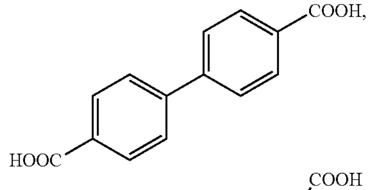

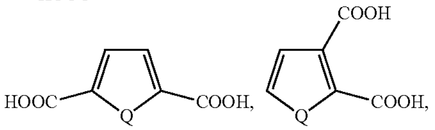

Q = O or S    Q = O or S

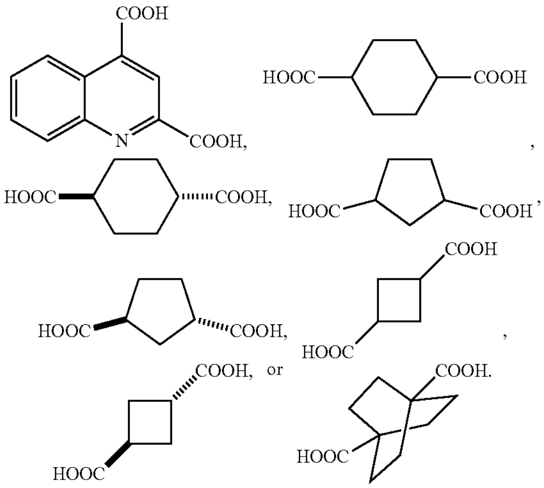

In another embodiment, a method of forming a conductive composite, comprises encapsulating a particulate metal with a polycannabinoid to form an encapsulate; optionally applying the encapsulate to a substrate; and sintering the encapsulate to aggregate the metal particles to form a conductive composite.

These and other features and characteristics are more particularly described below.

BRIEF DESCRIPTION OF THE DRAWINGS

The features and advantages of the invention are apparent from the following description taken in conjunction with the accompanying drawings in which.

DETAILED DESCRIPTION

Figure 1B:
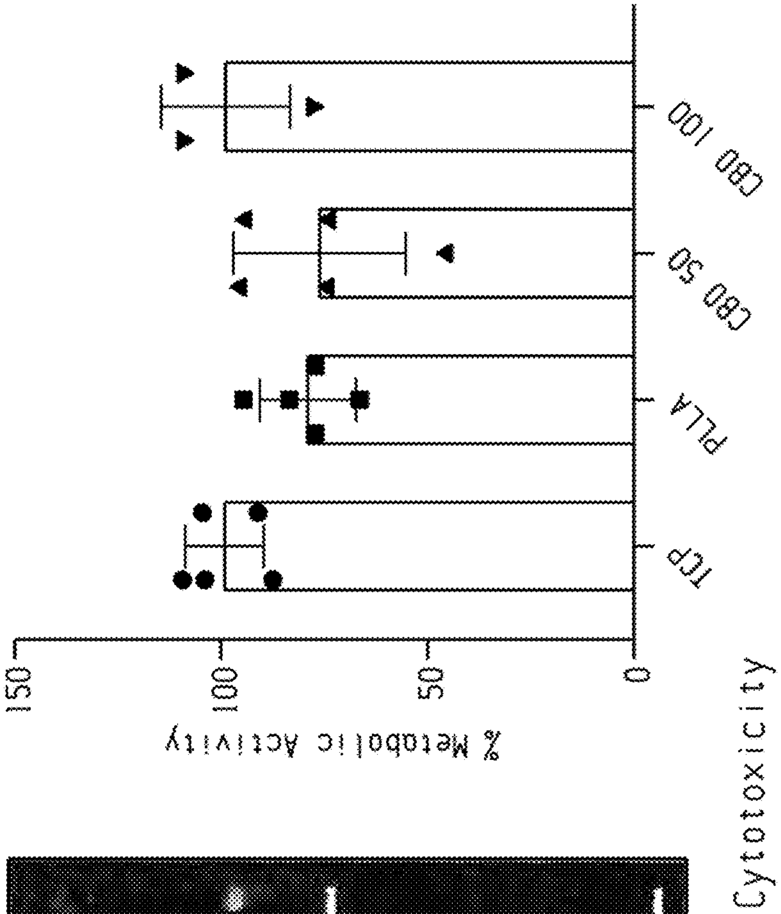
FIG. 1A, FIG. 1B, and FIG. 1C are graphics depicting cytotoxicity (FIG. 1A), % metabolic activity (FIG. 1*i*), and oxygen radical absorbency (FIG. 1C) for various materials including TCP, PLLA and CBD.

The following detailed description is merely exemplary in nature and is not intended to limit the disclosure or the application and uses of the subject matter as described herein. Furthermore, there is no intention to be bound by any theory presented in the preceding background or the following detailed description.

Disclosed herein are compositions comprising polycannabinoid materials in combination with metallic materials. Generally, the resulting composition exhibits a variety of properties and may be tuned for particular aspects such as demonstration of particular electrical properties including electrical conductivity, physical properties, degradability including tunable degradation rates, corrosion inhibition, oxidation inhibition, biological compatibility, and controlled release of bioactive compounds. The unique value of the composite materials leverage one or more of the properties of poly(cannabinoids): (1) the antioxidant properties, (2) the degradability, and (3) the mechanical properties, and (4) the thermal properties.

Generally, process for development of the compositions disclosed herein provide for stabilization of highly unstable metals or materials when in the presence of oxygen or other oxidizing compounds. This is through formation of new composites with new functions, but also for development of biodegradable materials that release active components over time.

The other component of the composite depends on the desired functional properties, and can include:

a. Industrial metals such as copper and steel
b. Degradable metals such as Mg, Fe, Zn, Mo and W
c. MXenes
d. Conjugated polymers
e. Biologically active components (enzymes, antibodies, etc).

Examples of metals that may be used include transition metals such as zinc, magnesium, copper, iron, nickel, tungsten, chromium and others as well as combinations thereof. In some examples, other metals, such as post-transition metals such as aluminum, lead, and tin and others as well as combinations thereof. The metals may fulfill a role in metabolic processes, and/or be provided for electrical, structural and/or mechanical purposes. Generally, the metallic component of the composition may be provided in a particulate form, but this is not limiting of the teachings herein.

The invention disclosed herein relates to polymeric cannabinoid materials (PolyCBD), and in particular to conductive or other element-containing compositions. Generally, the materials are naturally biodegradable and have tunable polymeric material properties.

The techniques disclosed herein provide for stabilization in composites of highly unstable metals (Mg, etc.) or materials (MXenes, superconductors, Zeolites, etc.) from oxygen (oxidation), or other compounds (drugs, etc.)—both forming new composites with new functions but also long-lasting internal components, or, by design, degradable materials that release the active component over time. Other organic materials may be incorporated.

The polycannabinoids used in the compositions comprising polycannabinoid materials in combination with metallic materials described herein are naturally biodegradable and may be tuned to exhibit a variety of properties, they are inexpensive to produce, and the compositions find use in a variety of applications and in the fabrication of a variety of devices. Non-limiting examples of uses of these compositions include as commodity polymers and for commodity electronics e.g., conducting wires and circuitry, biodegradable and conductive inks, implantable devices, wearable biomedical monitoring devices, and other applications. Each application is discussed in further detail herein.

Cannabinoid Polymers

Oils extracted from the hemp plant are called cannabinoids. Cannabinoids that have two hydroxyl groups, called diol cannabinoids, can be polymerized with dicarboxylic acids to create a polymer. The condensation reaction between the hydroxyl and carboxylic acid groups creates an ester bond that is degradable in the presence of water. Consequently, poly(cannabinoids) are biodegradable. The large number of cannabinoid monomers (>10) and dicarboxylic acids (>100) means that there are a large number of polymer structures.

In contrast to the monomers used to create most other bio-derived polyesters, cannabinoid monomers have ring structures that provide radical scavenging and antioxidant properties. After polymerization to form poly(cannabinoids), the ring structures in the monomers modify the interpolymer interactions to allow a large range of mechanical properties.

In one aspect, a polycannabinoid polymer comprises a plurality of cannabinoid units, specifically phytocannabinoid units. As used herein the term "Cannabinoid polymer(s)" and "polycannabinoid(s)" refer to a polymer comprising plurality of cannabinoid units.

In certain embodiments, the cannabinoid polymer is a polymer comprising a plurality of cannabinoid units of the formula:

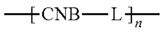

or

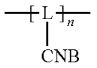

wherein:

CNB is a cannabinoid unit,

L is a linking group; and n represents the number of repeat units wherein n is at least 2.

The cannabinoid units may be the same or different. In certain embodiments, each cannabinoid unit is independently CBG, CBD, CBC, CBND, DHCBD, CBG-R, CBD-R, CBC-R, CBND-R, DHCBD-R wherein the cannabinoid unit is bound to the linking group via hydroxyl groups, acid groups, or ester groups on the cannabinoid unit before polymerization. Additional cannabinoids and cannabinoid derivatives can be found, for example, in Morales P, Reggio PH and Jagerovic N (2017) An Overview on Medicinal Chemistry of Synthetic and Natural Derivatives of Cannabidiol. *Front. Pharmacol.* 8:422, the contents of which are incorporated herein in their entirety by reference.

| Cannabinoid Abbreviation | Cannabinoid |
|---|---|
| CBC | cannabichromene |
| CBC-R | substituted cannabichromene |
| CBD | cannabidiol |
| CBD-R | substituted cannabidiol |
| CBG | cannabigerol |
| CBG-R | substituted cannabigerol |
| DHCBD | dihydrocannabidiol |
| DHCBD -R | substituted dihydrocannabidiol |
| CBND | cannabinodiol |
| CBND-R | substituted cannabinodiol |
| THCA | Tetrahydrocannabinolic acid |

In certain embodiments, each cannabinoid unit may be the same or different and each has one of the following structures before polymerization, wherein the R group is $C_1$-$C_{10}$ alkyl optionally substituted with one or more heteroatoms, a heterocycloalkyl group, or a heteroaryl group, specifically $C_1$-$C_6$ alkyl, and more specifically n-pentyl or n-propyl; for the naturally occurring phytocannabinoids like CBD and CBG, R=methyl, ethyl, propyl, butyl, pentyl, hexyl, 4'-(3-carboxypropyl)-, 4'-(4-hydroxybutyl), 1,1-dimethylheptyl, 4'-[2-(1H-1,2,3-triazol-yl)ethyl]-, 4'-(2-morpholinoethyl)-, 4'-(2-ethoxyethyl)-:

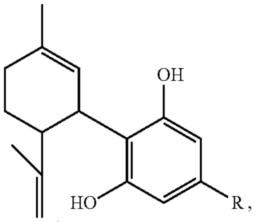

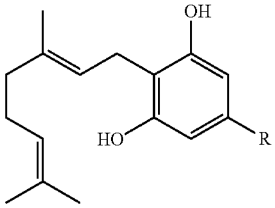

,

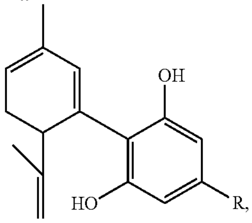

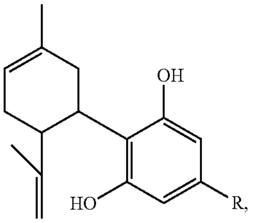

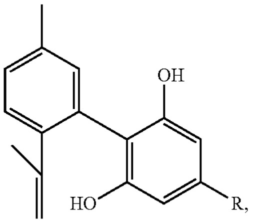

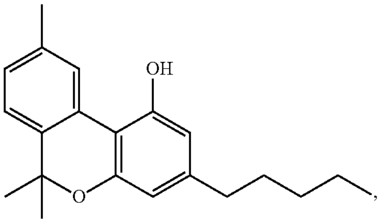

-continued

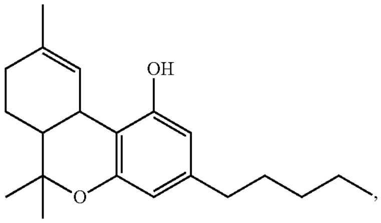

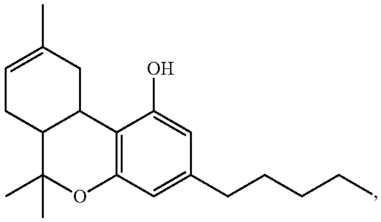

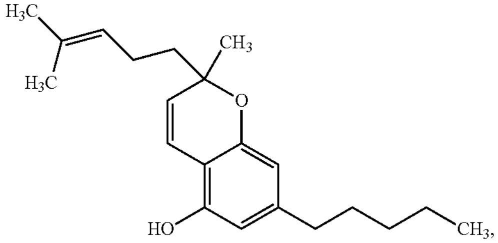

or

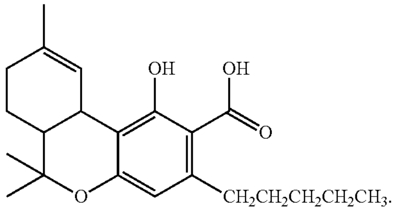

In certain embodiments, each cannabinoid unit may be the same or different and each has one of the following structures before polymerization:

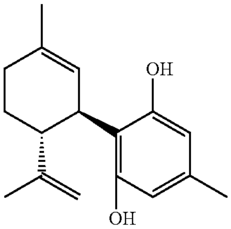

CBD-C1

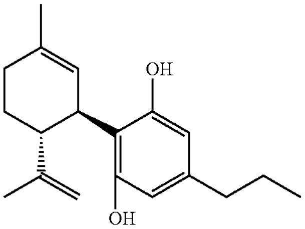

CBDV

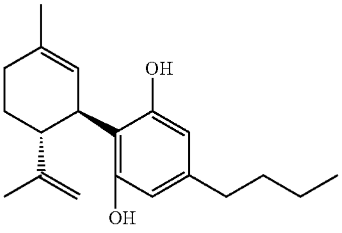

CBD-C4

-continued
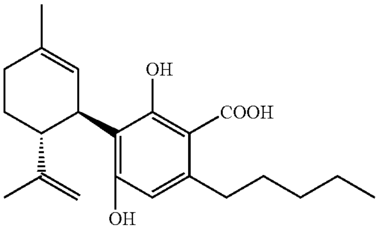
CBDA
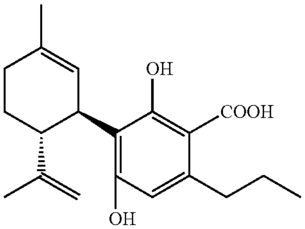
CBDVA-C3
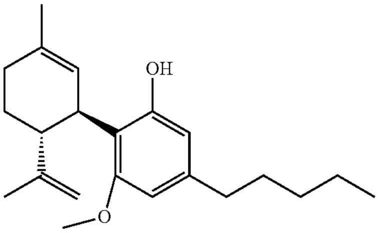
CBDM
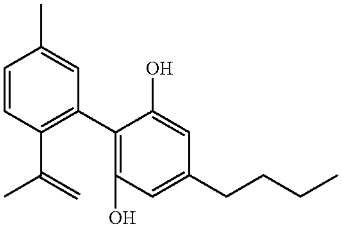
CBDND-C5
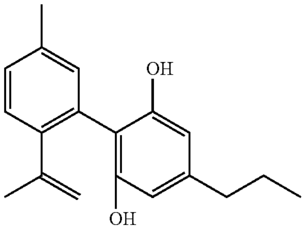
CBDND-C3
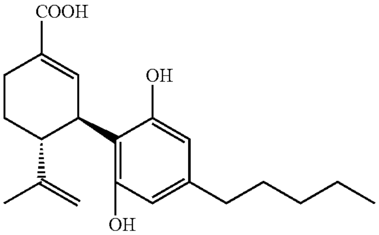
7-COOH-CBD
-continued
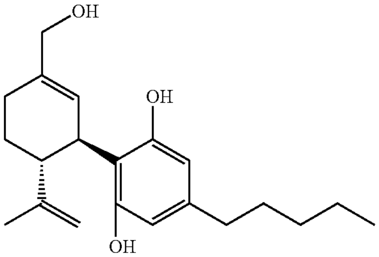
7-OH-CBD
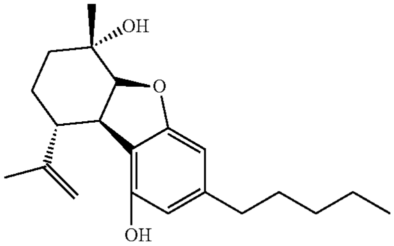
CBE
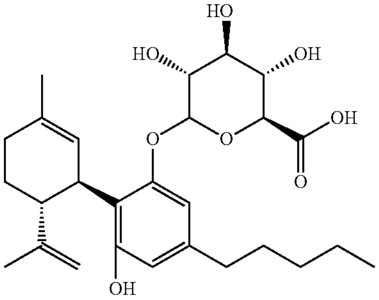
2′O-Glucuronide-CBD
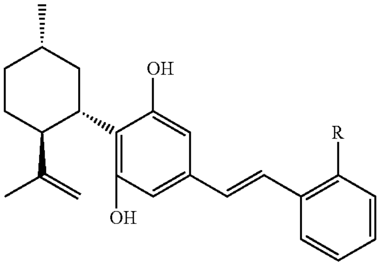
R = H; Machaeridiol A
R = OH; Machaeridiol B
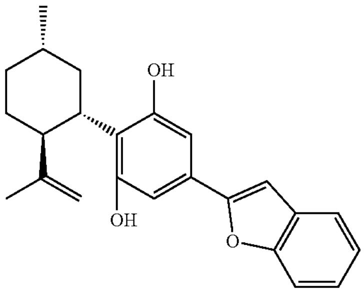
Machaeridiol C -continued
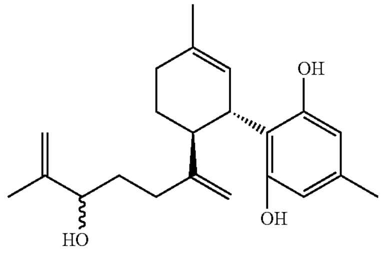
Ferruginene C
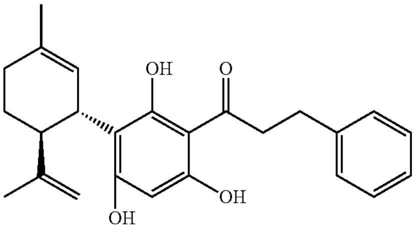
Linderatin
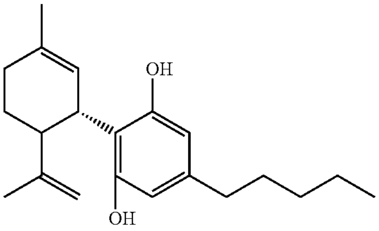
(+)-CBD
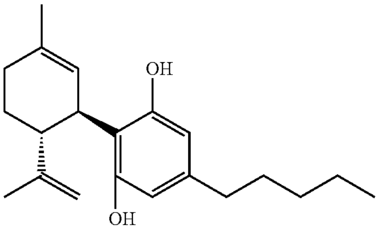
$H_2$-CBD
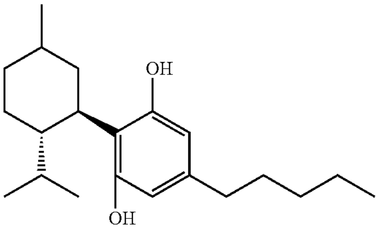
$H_4$-CBD
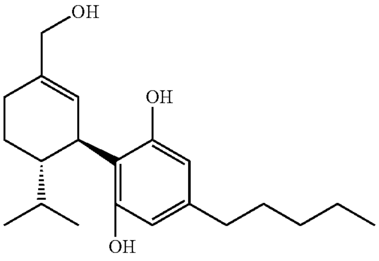
HU-446
-continued
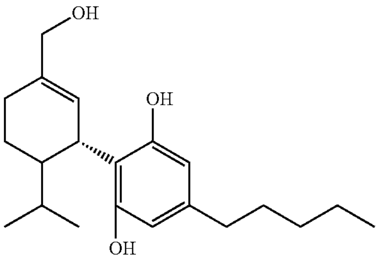
HU-465
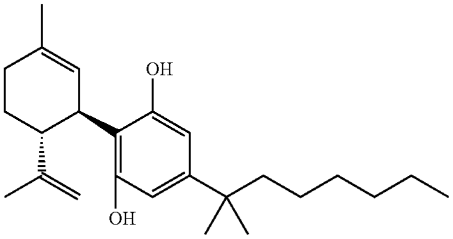
(-)-DMH-CBD
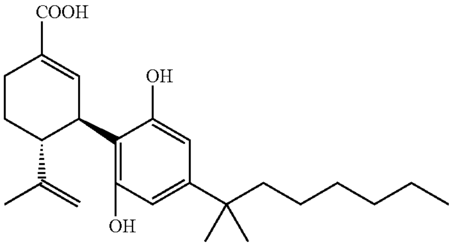
HU-320
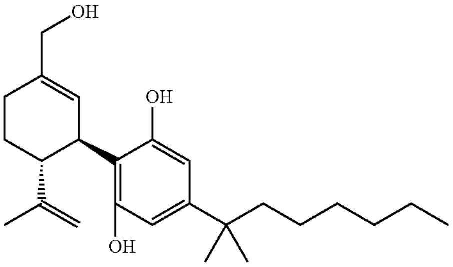
7-OH-DMH-CBD
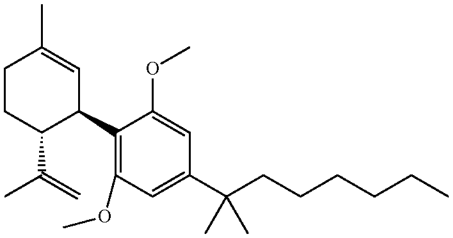
DMH-CBDD
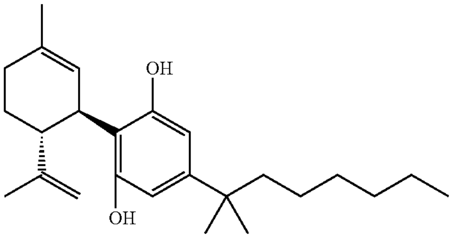
$H_2$-DMH-CBD -continued
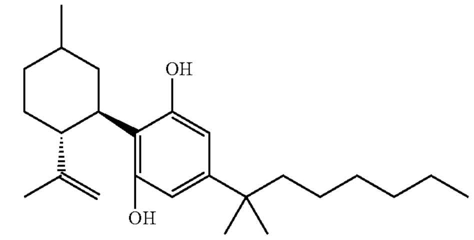
$H_4$-DMH-CBD
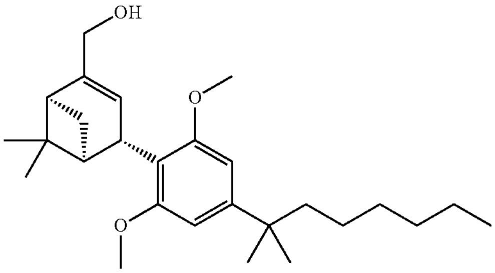
HU-308
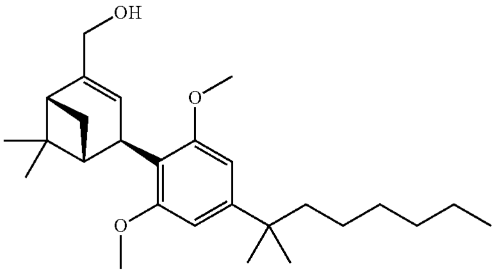
HU-433
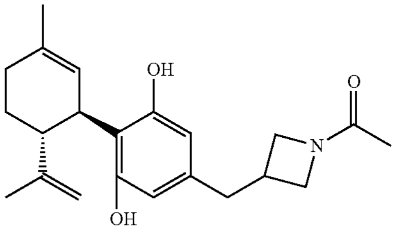
KLS-13019
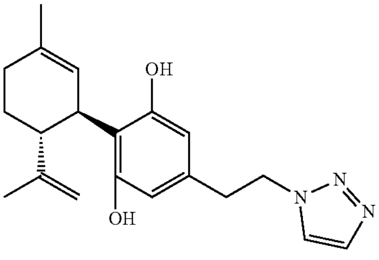
4′-[2-(1H-1,2,3-Triazol-yl)ethyl]-CBD
-continued
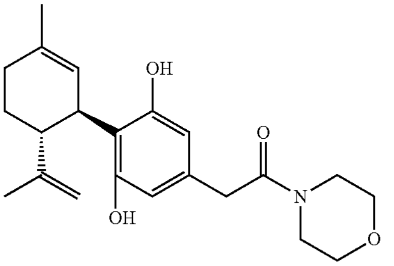
4′-(2-Morpholinoethyl)-CBD
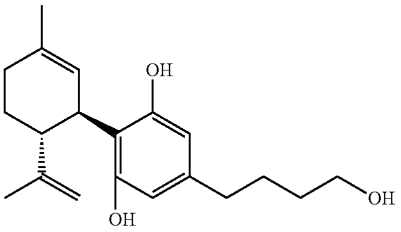
4′-(4-Hydroxybutyl)-CBD
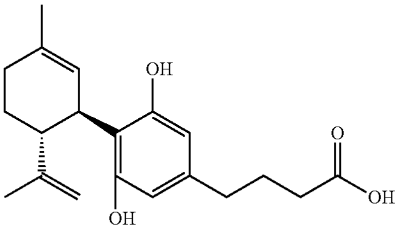
4′-(3-Carboxypropyl)-CBD
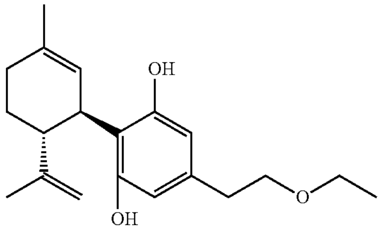
4′-(2-Ethoxyethyl)-CBD
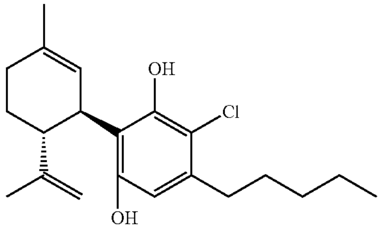
3′-Cl-CBD
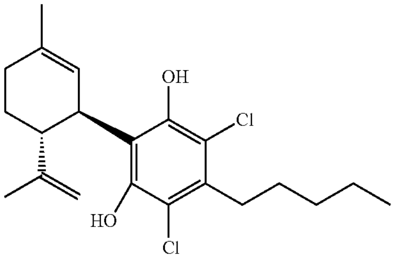
3′, 5-diCl-CBD -continued
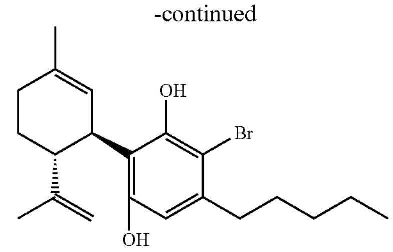
3'-Br-CBD
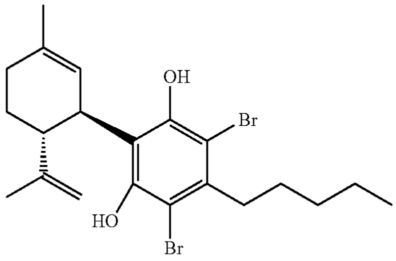
3', 5-diBr-CBD
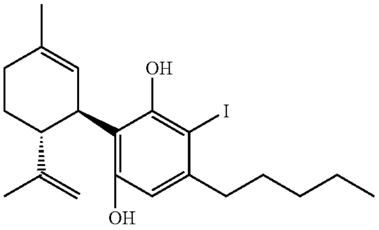
3'-I-CBD
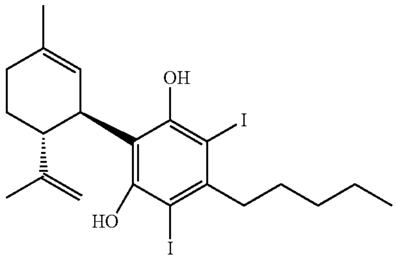
3', 5-diI-CBD
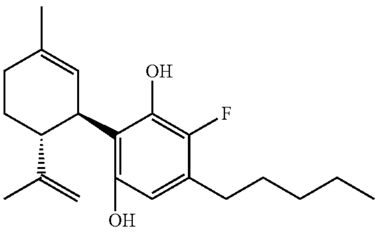
HUF-101
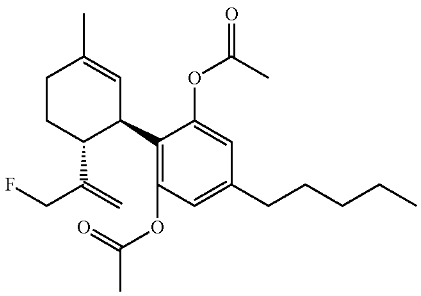
HUF-102
-continued
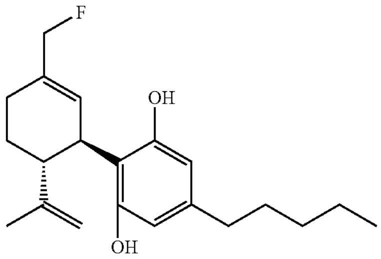
HUF-103
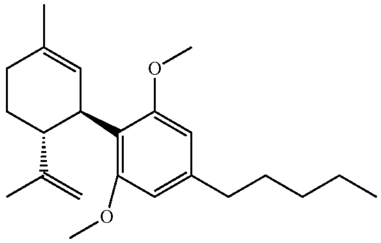
CBDD
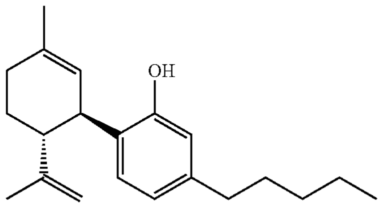
Desoxy-CBD
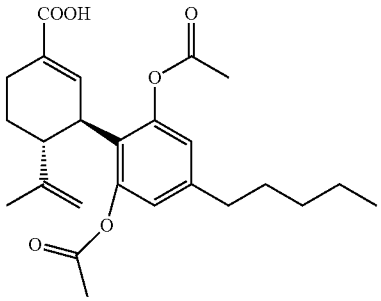
HU-444
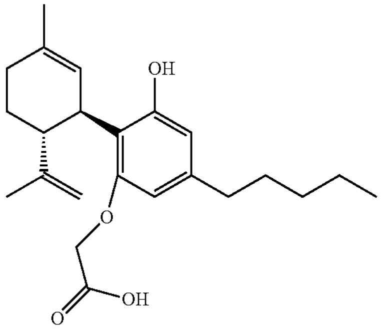
HU-410

-continued
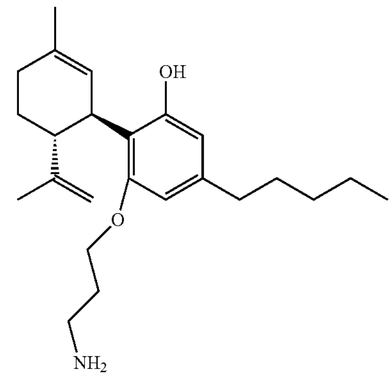
HU-427
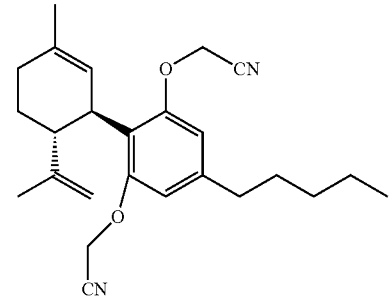
HU-432
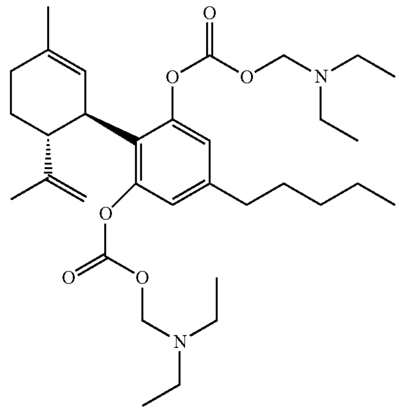
ALL00102
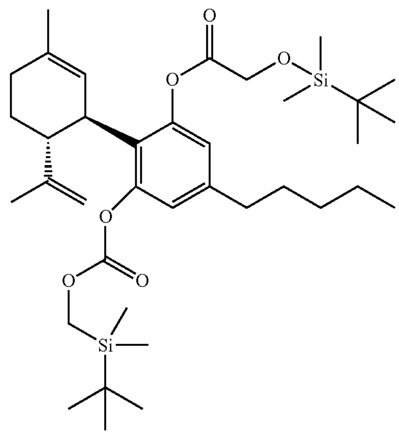
ALL00147
-continued
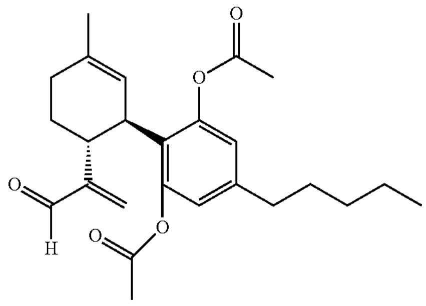
CBD-aldehyde-diacetate
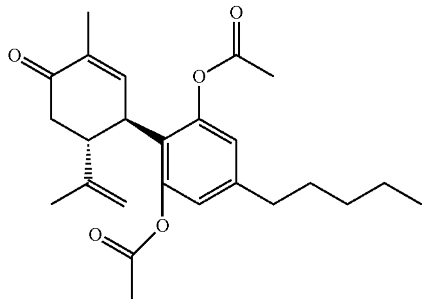
6-Oxo-CBD-diacetate
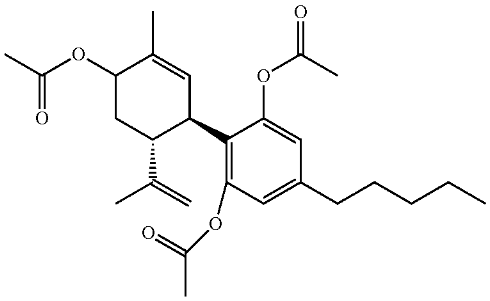
6-Hydroxy-CBD-triacetate
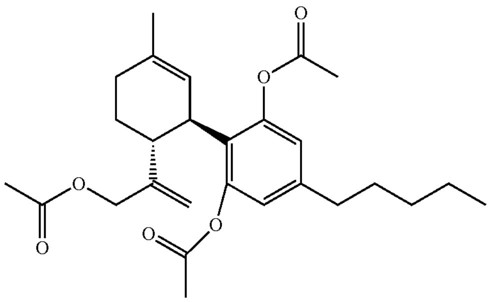
9-Hydroxy-CBD-triacetate
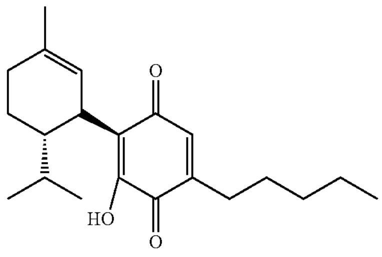
HU-331

-continued

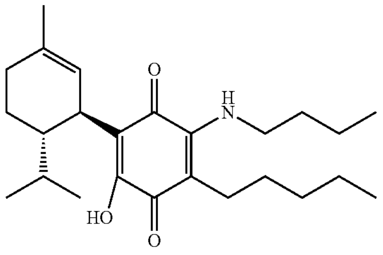

CBD-Q (V)

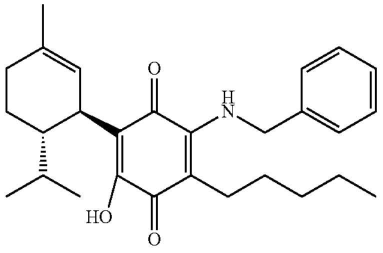

CBD-Q (VIII)

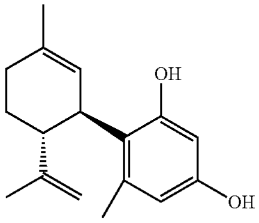

O-1602

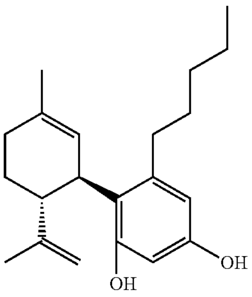

Abn-CBD

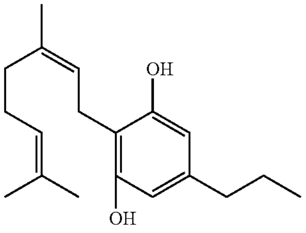

CBG

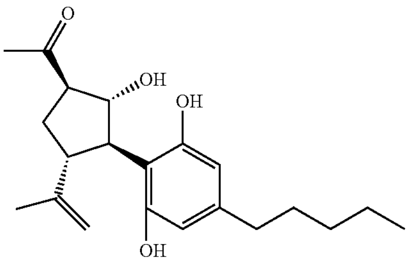

Cannabimovone

In certain embodiments, each cannabinoid unit may be the same or different and each has one of the following structures before polymerization:

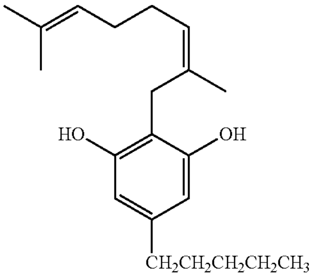

Cannabigerol (CGB) - 1 ring

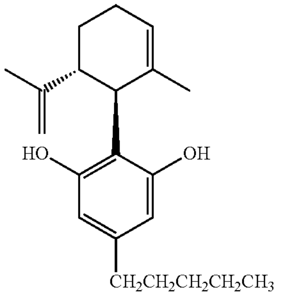

Cannabidiol (CGB) - 2 rings

Tetrahydrocannabinolic acid (THCA)—3 fused rings:

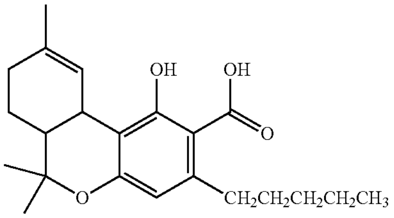

The polymer can be formed by reacting the hydroxyl or other reactive functionalities, such as the diacetate or similar esters made from the hydroxyls on the cannabinoid unit or cannabinoid derivative with an electrophilic difunctional comonomer to produce the linkers, L.

In certain embodiments, the linking group which generally binds the cannabinoid unit are via linear or branched hydrocarbon chains containing from 3 to 50 carbon atoms, optionally interrupted with one or more oxygen atoms, these chains can be alkyl, alkenyl or alkynyl chains containing from 3 to 50 carbon atoms, or else polyether chains containing from 3 to 50 carbon atoms, it being possible for these chains to be substituted with hydrophilic groups (hydroxyl groups, for example). The chains binding the cannabinoid units to one another contain at least 3 carbon atoms and specifically from 4 to 50 carbon atoms, the shortest path between two cannabinoid units specifically consisting of a chain containing between 3 and 8 carbon atoms.

Advantageously, the linking groups which link two cannabinoid units to one another may include linking groups of the general formula $—O—(CH_2—CHOR^1—CH_2)_m—O—$, where m is an integer between 1 and 50 (generally between 2 and 10) and where, in each of the n units $(CH_2—CHOR^1—CH_2)$, $R^1$ denotes either a hydrogen atom or a $—CH_2—CHOH—CH_2—O—$ chain bound to a cannabinoid unit of the polymer.

The polymers can be obtained by coupling cannabinoid molecules with bifunctional compounds capable of forming covalent bonds with the hydroxyl groups of the cannabinoid. For example, they may be dicarboxylic acids such as citric acid, fumaric acid, glutamic acid, maleic acid, malic acid, terephthalic acid, isophthalic acid, naphthalene-2,6-dicarboxylic acid, oxaloacetic acid, phthalic acid, butanedioic acid, oxalic acid, malonic acid, succinic acid, glutaric acid, adipic acid, pimelic acid (heptanedioic acid), suberic acid (octanedioic acid), azelaic acid (nonanedioic acid), sebacic acid (decanedioic acid), undecanedioic acid, dodecanedioic acid, pyridine-2,6-dicarboxylic acid, 1H-imidazole-4,5-dicarboxylic acid, furan-2,5-dicarboxylic acid, furan-2,3-dicarboxylic acid, thiophene-2,5-dicarboxylic acid, thiophene-2,3-dicarboxylic acid, quinoline-2,4-dicarboxylic acid, cyclohexane-1,4-dicarboxylic acid, cyclopentane-1,3-dicarboxylic acid, cyclobutane-1,3-dicarboxylic acid, or bicyclo [2.2.2]octane-1,4-dicarboxylic acid, or a bifunctional compound such as

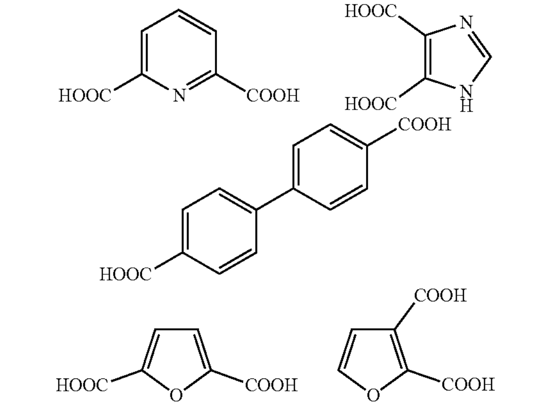

Q = O or S Q = O or S

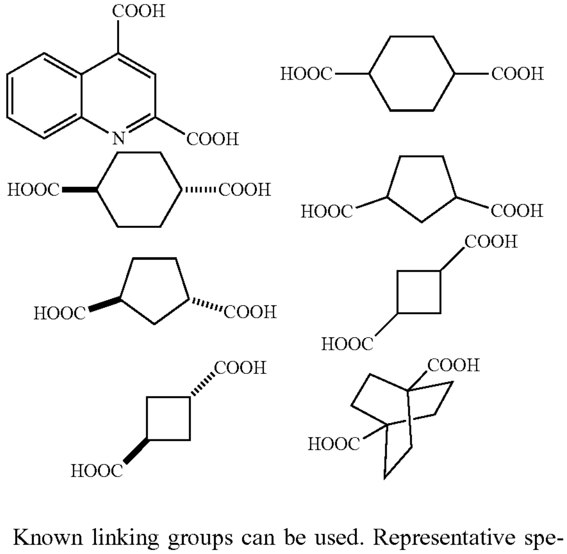

Known linking groups can be used. Representative specific examples of the linking groups are those monomers which polymerize to form vinyl polymers, polyurethanes, polyesters, polyethers, polyamides, polyimides, polyamino acids, polypeptides, polysaccharides, and the like. When the linking group is a vinyl monomer, specific examples of the vinyl polymer include (meth)acrylic monomers, styrene monomers, (meth)acrylamide monomers, ethylene monomers, propylene monomers, oxyethylene monomers, ethylene glycol monomers, propylene glycol monomers, monomers of vinyl alcohol, vinyl acetate monomers, vinyl chloride monomers, and the like. As used herein, (meth) acrylate refers to acrylate or methacrylate, and (meth)acrylic refers to methacrylic or acrylic.

Examples of (meth)acrylic monomers include (meth) acrylic acids and salts thereof, and (meth)acrylic acid esters such as methyl (meth)acrylate, ethyl (meth)acrylate, hydroxymethyl (meth)acrylate, and hydroxyethyl (meth) acrylate. Examples of styrene monomers include styrene, styrene sulfonates, and the like. Examples of (meth)acrylamide polymers include (meth)acrylamides, and (meth) acrylamide derivatives such as dimethyl (meth)acrylamide, diethyl (meth)acrylamide, N-isopropylacrylamide, and N-benzylacrylamide. The linking group monomers are not limited to those mentioned above as examples. Conventionally known vinyl monomers are also usable.

The cannabinoid polymer may be a homopolymer, or a copolymer obtained by copolymerzing monomers. When the cannabinoid polymer is a copolymer with one or more additional polymers, the additional polymers may be any of random copolymers, alternating copolymers, graft copolymers, or block copolymers. The side chain of the additional polymers may be substituted with a functional group. That is, as long the desired effect of the cannabinoid polymer is not impaired, the main chain and side chains of the additional polymers may be modified with other substituents by chemical bonds or the like.

In certain embodiments, the cannabinoid monomer can be incorporated into a thermoplastic polymer or a biodegradeable polymer.

Suitable thermoplastic polymers include, but are not limited to polylactides, polyglycolides, polycaprolactones, polyanhydrides, polyamides, polyurethanes, polyesteramides, polyorthoesters, polydioxanones, polyacetals, polyketals, polycarbonates, polyorthocarbonates, polyphosphazenes, polyhydroxybutyrates, polyhydroxyvalerates, polyalkylene oxalates, polyalkylene succinates, poly(malic acid) polymers, polymaleic anhydrides, poly(methylvinyl) ethers, poly(amino acids), chitin, chitosan, polythiocarbonates, polythiourethanes, and copolymers, terpolymers, or combinations or mixtures of the above materials.

Examples of biodegradable polymers and oligomers suitable for use in the compositions and methods include, but are not limited to, poly(lactide)s; poly(glycolide)s; poly (lactide-co-glycolide)s; poly(lactic acid)s; poly(glycolic acid)s; and poly(lactic acid-co-glycolic acid)s; poly(caprolactone)s; poly(malic acid)s; polyamides; polyanhydrides; polyamino acids; polyorthoesters; polyetheresters; polycyanoacrylates; polyphosphazines; polyphosphoesters; polyesteramides; polydioxanones; polyacetals; polyketals; polycarbonates; polyorthocarbonates; degradable polyurethanes; polyhydroxybutyrates; polyhydroxyvalerates; polyalkylene oxalates; polyalkylene succinates; chitins; chitosans; oxidized celluloses; and copolymers, terpolymers, blends, combinations or mixtures of any of the above materials.

As used herein, "hydrophobic" refers to a polymer that is substantially not soluble in water. As used herein, "hydrophilic" refers to a polymer that may be water-soluble or to a polymer having affinity for absorbing water, but typically not when covalently linked to the hydrophobic component as a co-polymer, and which attracts water into the device.

The cannabinoid unit can be incorporated into hydrophilic polymers. Hydrophilic polymers suitable for use herein can be obtained from various commercial, natural or synthetic sources well known in the art. Suitable hydrophilic polymers include, but are not limited to: polyanions including anionic polysaccharides such as alginate; agarose; heparin; polyacrylic acid salts; polymethacrylic acid salts; ethylene maleic anhydride copolymer (half ester); carboxymethyl amylose; carboxymethyl cellulose; carboxymethyl dextran; carboxymethyl starch; carboxymethyl chitin/chitosan; carboxy cellulose; 2,3-dicarboxycellulose; tricarboxycellulose; carboxy gum arabic; carboxy carrageenan; carboxy pectin; carboxy tragacanth gum; carboxy xanthan gum; carboxy guar gum; carboxy starch; pentosan polysulfate; curdlan; inositol hexasulfate; beta.-cyclodextrin sulfate; hyaluronic acid; chondroitin-6-sulfate; dermatan sulfate; dextran sulfate; heparin sulfate; carrageenan; polygalacturonate; polyphosphate; polyaldehydo-carbonic acid; poly-1-hydroxy-1-sulfonate-propen-2; copolystyrene maleic acid; mesoglycan; sulfopropylated polyvinyl alcohols; cellulose sulfate; protamine sulfate; phospho guar gum; polyglutamic acid; polyaspartic acid; polyamino acids; and any derivatives or combinations thereof. One skilled in the art will appreciate other hydrophilic polymers can also be used.

The cannabinoid unit can be incorporated into various water-soluble polymers. Water-soluble polymers include, but are not limited to: poly (alkyleneglycol), polyethylene glycol ("PEG"); propylene glycol; ethylene glycol/propylene glycol copolymers; carboxylmethylcellulose; dextran; polyvinyl alcohol ("PVOH"); polyvinyl pyrolidone; poly (alkyleneamine)s; poly (alkyleneoxide)s; poly-1,3-dioxolane; poly-1,3,6-trioxane; ethylene/maleic anhydride copolymers; polyaminoacids; poly (n-vinyl pyrolidone); polypropylene oxide/ethylene oxide copolymers; polyoxyethylated polyols; polyvinyl alcohol succinate; glycerine; ethylene oxides; propylene oxides; poloxamers; alkoxylated copolymers; water soluble polyanions; and any derivatives or combinations thereof. In addition, the water-soluble polymer may be of any suitable molecular weight and may be branched or unbranched.

In certain embodiments, the cannabinoid polymers can be endcapped with a suitable monomer having a singularly reactive monomer. The endcap can be any group which does not alter the polymer properties or reduce the efficacy of the cannabinoid units. In particular embodiments, the endcap groups can be, independently, a linear or branched alcohol, or a singly reactive cannabinoid unit, for example, a cannabinoid unit having only one hydroxy group, one acid group, or one ester group. In certain embodiments, the endcap may have additional reactive cites which are protected during the reaction with the polymer and are later deprotected to provide additional reactive functionality to the polymer. In certain embodiments, each singly reactive cannabinoid unit has the structure:

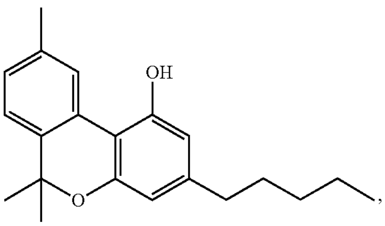, for R = pentyl is CBN or CBN-R

-continued

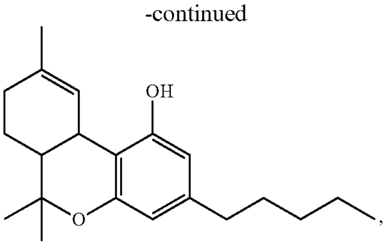, for R = pentyl is Δ9-THC or Δ9-THC-R

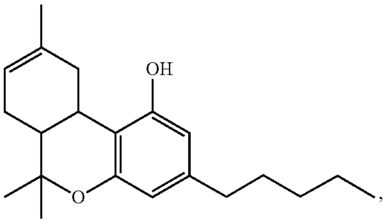, or for R = pentyl is Δ8-THC or Δ9-THC-R

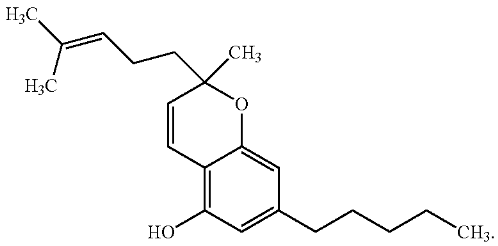.

CBC

In general. the cannabinoid polymers have a number average molecular weight of about 1,000 daltons to about 60,000 daltons. In certain embodiment, the cannabinoid polymers has a number average molecular weight of about 5,000 daltons to about 55,000 daltons, a number average molecular weight of about 6,000 daltons to about 50,000 daltons, a number average molecular weight of about 7,000 daltons to about 50,000 daltons, a number average molecular weight of about 9,000 to about 40,000 daltons, or a number average molecular weight of about 10,000 to about 30,000 daltons.

The particular process to be utilized in the preparation of the cannabinoid polymers depends upon the specific polymers desired. Such factors as the selection of the specific substituents play a role in the path to be followed in the preparation of the specific compounds. Those factors are readily recognized by one of ordinary skill in the art.

The cannabinoid polymers may be prepared by use of known chemical reactions and procedures. Nevertheless, the following general preparative methods are presented to aid the reader in synthesizing the compounds, with more detailed particular examples being presented below in the experimental section describing the working examples.

The cannabinoid polymers can be made according to conventional chemical methods, and/or as disclosed below, from starting materials which are either commercially available or producible according to routine, conventional chemical methods. General methods for the preparation of the compounds are given below, and the preparation of representative compounds is specifically illustrated in examples.

Exemplary general methods to make cannabinoid polymers described herein are illustrated in Reaction Schemes 1-4.

The cannabinoid polymers may be formed by solventless procedures (e.g. melt polymerizations) as well as those employing solvent including combinations of pure monomers if both are liquids (includes the melting of CBD or other cannabinoid to form a liquid, alternatively, the polymerization can be carried out in a solvent) or by interfacial polymerization.

Scheme 1

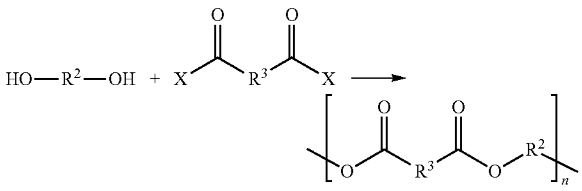

Scheme 1 presents a generic reaction scheme for the reaction of a cannabinoid diol monomer (HO—$R^2$—OH) with a dicarbonyl monomer to produce a cannabinoid polyester. Equal equivalents of each will produce a high molecular weight polymer (Mn>20 kDa). The non-diol monomer could be a dicarboxylic acid, a diester, a dianhydride, a diacid chloride where X would be equal to —OH, O—$R^4$, O—(C═O)—$OR^4$ wherein $R^4$ can be aliphatic, Cl, respectively. $R^3$ could be aliphatic, branched aliphatic, halogenated (halogen includes fluorine, chlorine, bromine) aliphatic, halogenated branched aliphatic, aromatic, ethyleneoxy (linear or branched ether) or combinations thereof.

Scheme 2

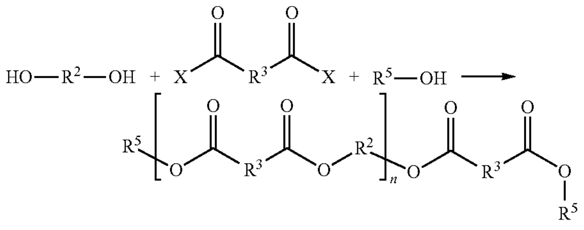

Scheme 2 presents a generic reaction scheme for the reaction of a cannabinoid diol monomer (HO—$R^2$—OH) with a dicarbonyl monomer in the presence of a cannabinoid with single hydroxy ($R^5$—OH) to produce a cannabinoid polyester with cannabinoid endcaps. Endcapping can control the molecule weight of the polymer and can control the ratio of the two cannabinoids. The non-diol monomer could be a dicarboxylic acid, a diester, a dianhydride, a diacid chloride where X would be equal to —OH, O—$R^4$, O—(C═O)—$OR^4$, Cl, respectively.

Scheme 3

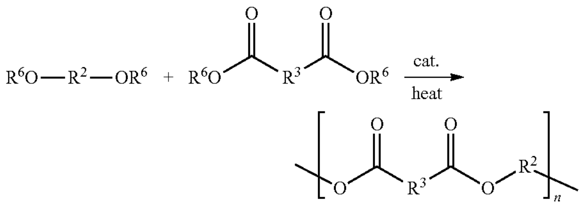

Scheme 3 shows a reaction in which diols are easily converted to ($R^6O$—$R^2$—$OR^6$) a short ester such as a methyl or ethyl ester ($R^6$=lower alkyl). The diester monomer can then be transesterified to produce a polyester.

Scheme 4

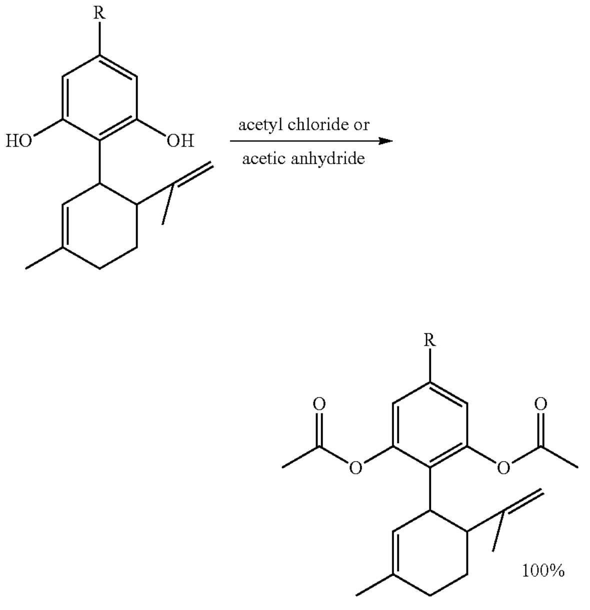

R = pentyl

Scheme 4 shows, as a model for polymerization, CBD can be converted quantitatively to diacetyl CBD in accordance to the following reaction. Diacetyl CBD is a colorless liquid whereas CBD is a solid. Hence, diacetyl CBD can allow for a liquid phase polymerization without solvent with another monomer to produce a high molecular weight polymer. The other diols can undergo similar chemistry to make diacetyl monomers for transesterification.

The polycannabinoids can be altered by the type of polymer (polyester, polyurethane, polycarbonate) which will then alter the polymer properties. Flexibility in the backbone will result in low Tg materials that will be rubbery at room temperature whereas reducing the flexibility will increase the Tg making them a glassy solid. Cannabinoids have an exact stereochemistry, so polymerization with a symmetrical comonomer can produce semi-crystalline polymers with the ability to be melt cast into films and fibers. Melt polymerization is also possible if the polymer generated is semicrystalline.

The cannabinoid polymers are thermally stable and stable against conversion of the target cannabinoid to another cannabinoid compound.

The use of aromatic diacids as the bifunctional compound to prepare the cannabinoid polymers impart rigidity to the polymer and the flat ring is important for morphology, stacking of rings. Aromatic bifunctional compounds containing pyridine and quinoline groups can catalyze the biodegradation of the polymer via ester hydrolysis as these groups are basic. Aromatic bifunctional compounds containing imidazole, which is both acidic and basic, provide a means to catalyze hydrolysis under both conditions.

The use of alicyclic groups provide rigidity but not at the cost of a lower bandgap. Furthermore, alicyclic groups do not display toxicities of compounds having benzene rings.

Aliphatic diacids as the bifunctional compound are expected to be soft segments in copolymers using aromatic or alicyclic diacids. The combination of hard and soft segments results in melt processable thermoplastic elastomers. Aliphatic diacids will generally have lower glass transition temperatures compared to homopolymer polycannabinoids containing ring groups.

Suitable homopolymers of cannabidiol (CBD) include the following.

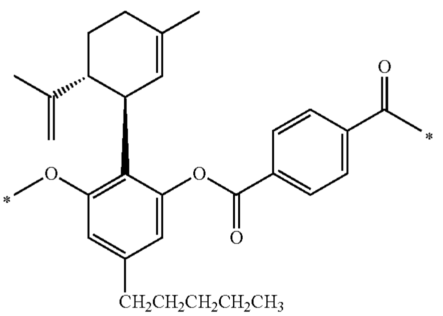

CC1=C[C@H]([C@H](C(C)=C)CC1)C2=C(O[*])C=C(CCCCC)C=C2OC(C3=CC=C(C([*])=O)C=C3)=O

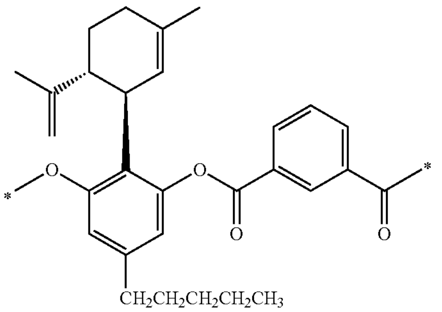

CC1=C[C@H]([C@H](C(C)=C)CC1)C2=C(O[*])C=C(CCCCC)C=C2OC(C3=CC(C([*])=O)=CC=C3)=O

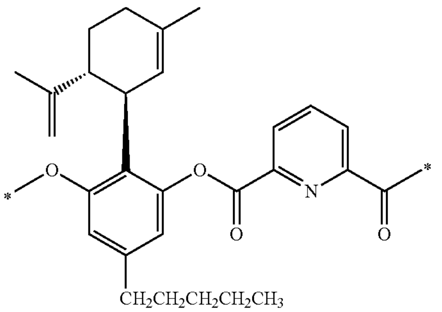

CC1=C[C@H]([C@H](C(C)=C)CC1)C2=C(O[*])C=C(CCCCC)C=C2OC(C3=NC(C([*])=O)=CC=C3)=O

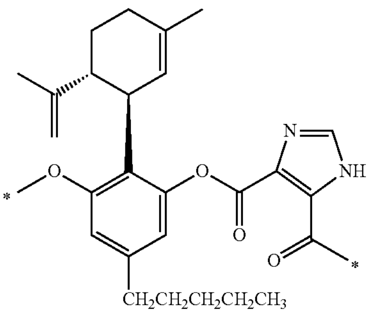

CC1=C[C@H]([C@H](C(C)=C)CC1)C2=C(O[*])C=C(CCCCC)C=C2OC(C3=C(C([*])=O)NC=N3)=O

-continued
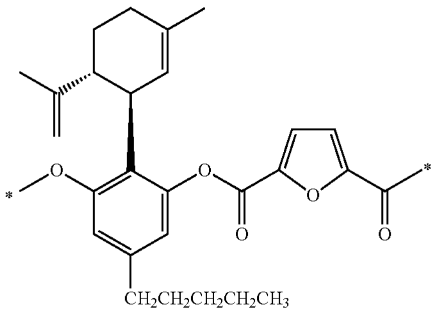
CC1=C[C@H]([C@H](C(C)=C)CC1)C2=C(O[*])C=C(CCCCC)C=C2OC(C3=CC=C(C([*])=O)O3)=O
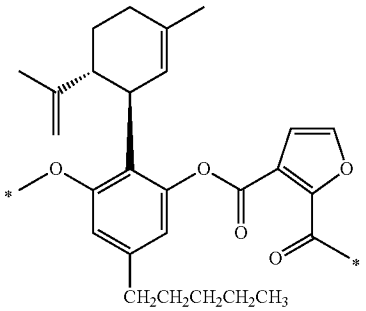
CC1=C[C@H]([C@H](C(C)=C)CC1)C2=C(O[*])C=C(CCCCC)C=C2OC(C3=C(C([*])=O)OC=C3)=O
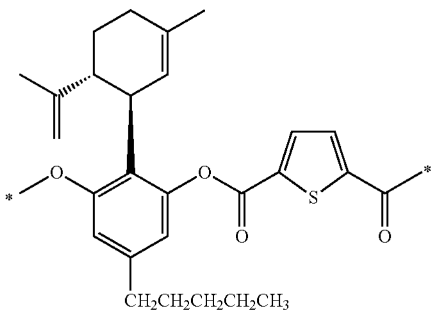
CC1=C[C@H]([C@H](C(C)=C)CC1)C2=C(O[*])C=C(CCCCC)C=C2OC(C3=CC=C(C([*])=O)S3)=O
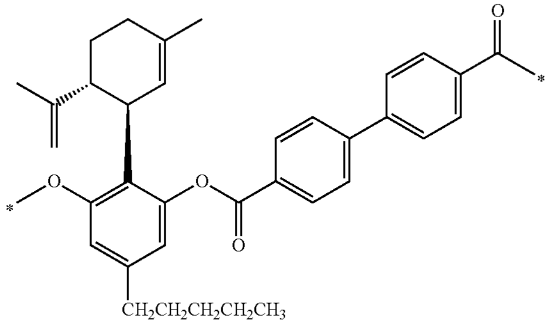
CC1=C[C@H]([C@H](C(C)=C)CC1)C2=C(O[*])C=C(CCCCC)C=C2OC(C3=CC=C(C4=CC=C(C([*])=O)C=C4)C=C3)=O -continued
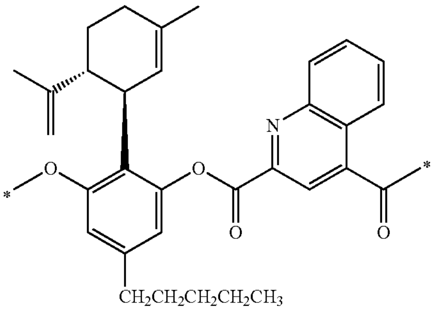
CC1=C[C@H]([C@H](C(C)=C)CC1)C2=C(O[*])C=C(CCCCC)C=C2OC(C3=NC4=C(C=CC=C4)C(C([*])=O)=CC=C3)=O
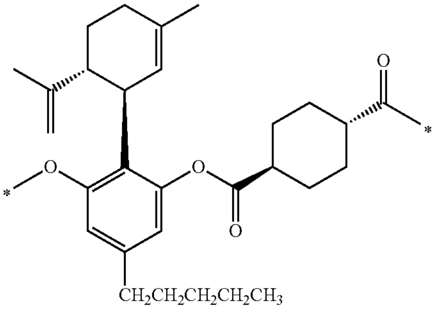
CC1=C[C@H]([C@H](C(C)=C)CC1)C2=C(O[*])C=C(CCCCC)C=C2OC[C@@H]3CC[C@@H](C([*])=O)CC3)=O
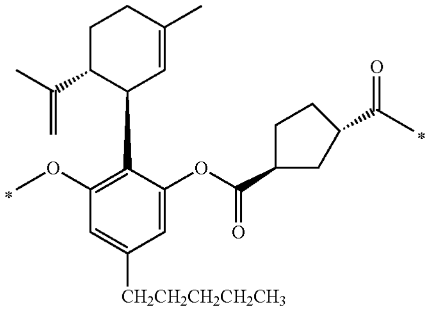
CC1=C[C@H]([C@H](C(C)=C)CC1)C2=C(O[*])C=C(CCCCC)C=C2OC[C@H](C3)CC[C@@H]3C([*])=O)=O
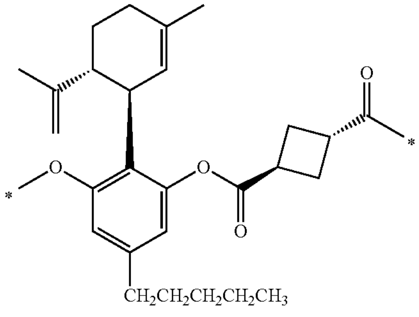
CC1=C[C@H]([C@H](C(C)=C)CC1)C2=C(O[*])C=C(CCCCC)C=C2OC[C@@H]3C[C@@H]C([*])=O)C3)=O

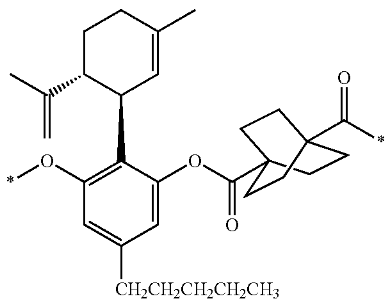
O=C(OC1=CC(CCCCC)=CC(O[*])=C1[C@H]2[C@H](C(C)=C)CCC(C)=C2)C34CCC(CC4)(C([*])=O)CC3
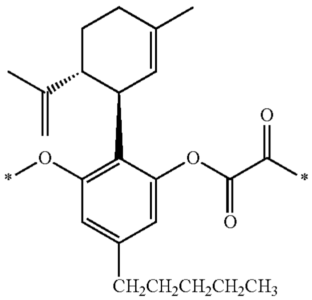
CC1=C[C@H]([C@H](C(C)=C)CC1)C2=C(O[*])C=C(CCCCC)C=C2OC(C([*])=O)=O
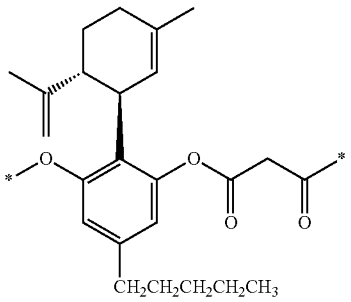
CC1=C[C@H]([C@H](C(C)=C)CC1)C2=C(O[*])C=C(CCCCC)C=C2OC(CC([*])=O)=O
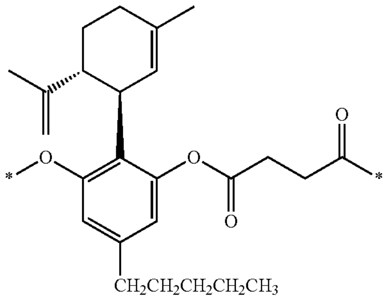
CC1=C[C@H]([C@H](C(C)=C)CC1)C2=C(O[*])C=C(CCCCC)C=C2OC(CCC([*])=O)=O
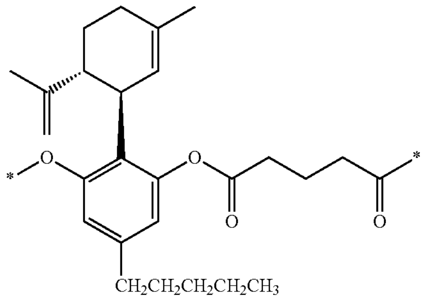
CC1=C[C@H]([C@H](C(C)=C)CC1)C2=C(O[*])C=C(CCCCC)C=C2OC(CCCC([*])=O)=O -continued
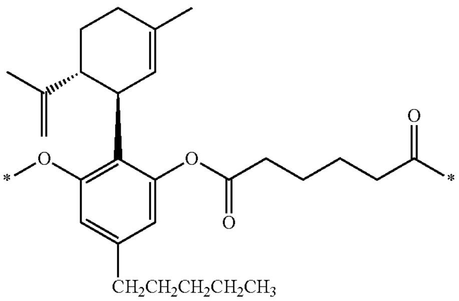
CC1=C[C@H]([C@H](C(C)=C)CC1)C2=C(O[*])C=C(CCCCC)C=C2OC(CCCCC([*])=O)=O
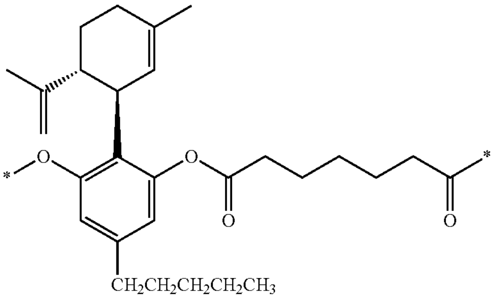
CC1=C[C@H]([C@H](C(C)=C)CC1)C2=C(O[*])C=C(CCCCC)C=C2OC(CCCCCC([*])=O)=O
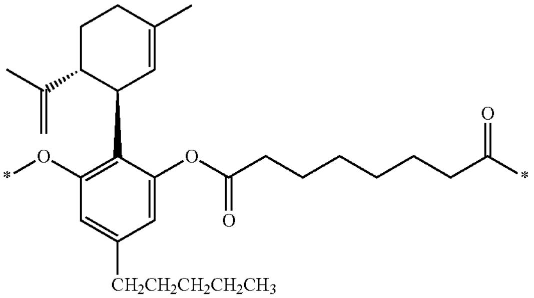
CC1=C[C@H]([C@H](C(C)=C)CC1)C2=C(O[*])C=C(CCCCC)C=C2OC(CCCCCCC([*])=O)=O
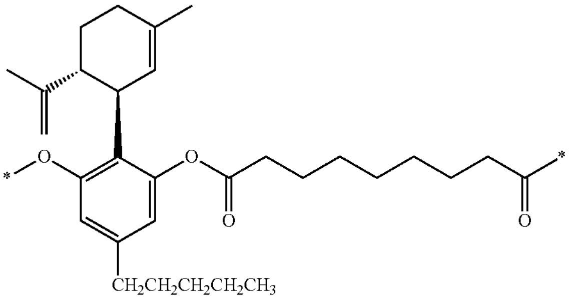
CC1=C[C@H]([C@H](C(C)=C)CC1)C2=C(O[*])C=C(CCCCC)C=C2OC(CCCCCCCC([*])=O)=O
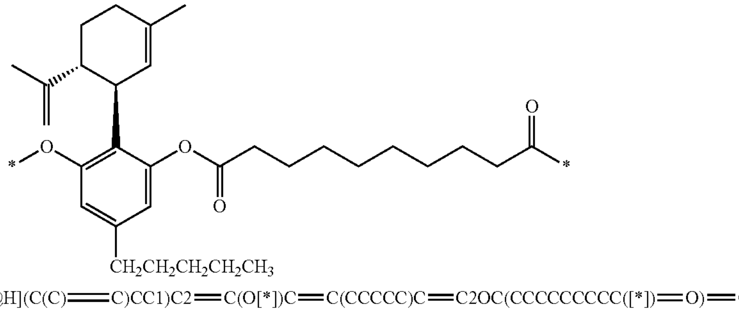
CC1=C[C@H]([C@H](C(C)=C)CC1)C2=C(O[*])C=C(CCCCC)C=C2OC(CCCCCCCCC([*])=O)=O Suitable homopolymers of cannabigerol (CBG) include the following.
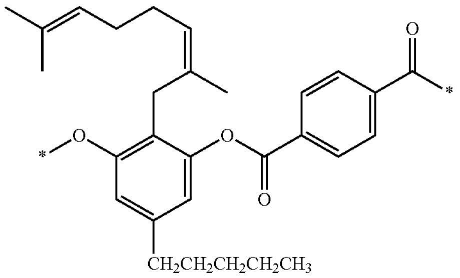
O=C(C1=CC=C(C([*])=O)C=C1)OC2=CC(CCCCC)=CC(O[*])=C2C/C(C)=C\CC/C=C(C)\C
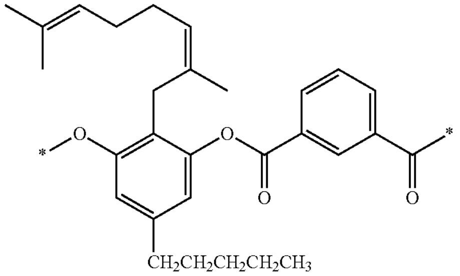
O=C(C1=CC(C([*])=O)=CC=C1)OC2=CC(CCCCC)=CC(O[*])=C2C/C(C)=C\CC/C=C(C)\C
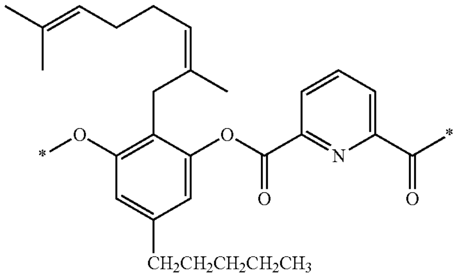
O=C(C1=NC(C([*])=O)=CC=C1)OC2=CC(CCCCC)=CC(O[*])=C2C/C(C)=C\CC/C=C(C)\C
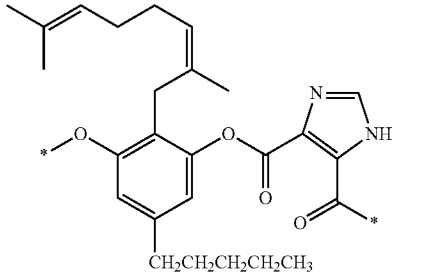
O=C(C1=C(C([*])=O)NC=N1)OC2=CC(CCCCC)=CC(O[*])=C2C/C(C)=C\CC/C=C(C)\C
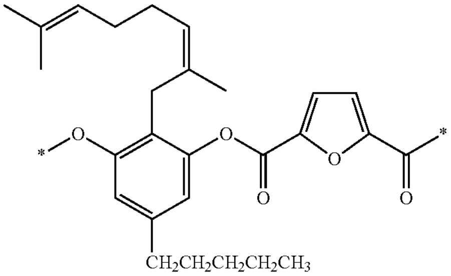
O=C(C1=CC=C(C([*])=O)O1)OC2=CC(CCCCC)=CC(O[*])=C2C/C(C)=C\CC/C=C(C)\C -continued
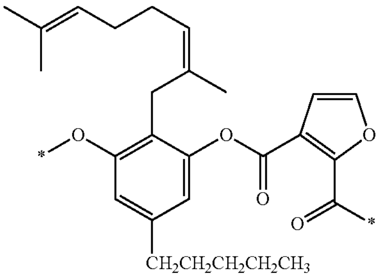
O=C(C1=C(C([*])=O)OC=C1)OC2=CC(CCCCC)=CC(O[*])=C2C/C(C)=C\CC/C=C(C)\C
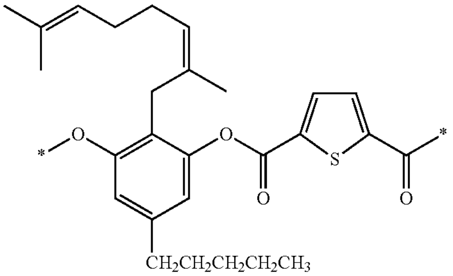
O=C(C1=CC=C(C([*])=O)S1)OC2=CC(CCCCC)=CC(O[*])=C2C/C(C)=C\CC/C=C(C)\C
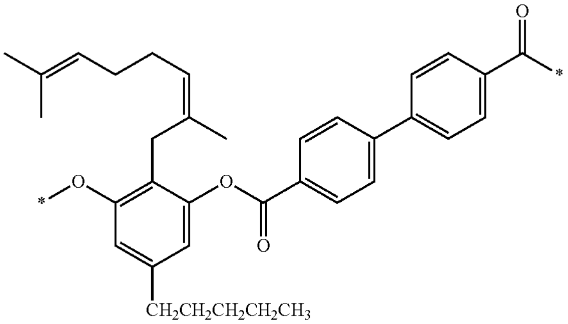
O=C(C1=CC=C(C2=CC=C(C([*])=O)C=C2)C=C1)OC3=CC(CCCCC)=CC(O[*])=C3C/C(C)=C\CC/C=C(C)\C
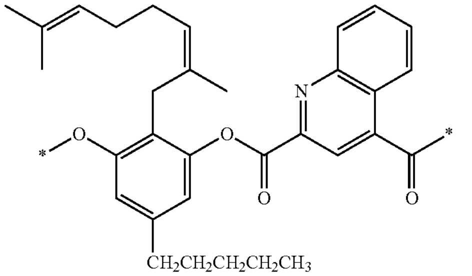
O=C(C1=NC2=C(C=CC=C2)C(C([*])=O)=C1)OC3=CC(CCCCC)=CC(O[*])=C3C/C(C)=C\CC/C=C(C)\C
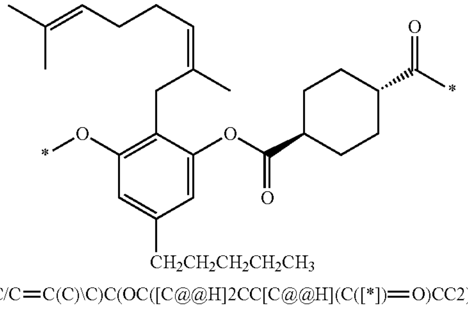
[*]OC1=C(C/C(C)=C\CC/C=C(C)\C)C(OC([C@@H]2CC[C@@H](C([*])=O)CC2)=O)=CC(CCCCC)=C1

-continued
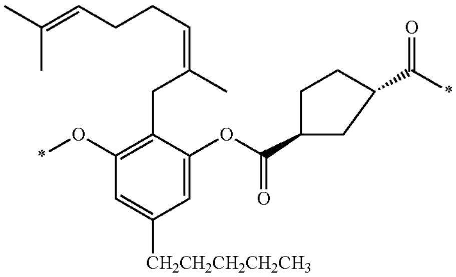
[*]OC1=C(C/C(C)=C\CC/C=C(C)\C)C(OC([C@H](C2)CC[C@@H]2C([*])=O)=O)=CC(CCCCC)=C1
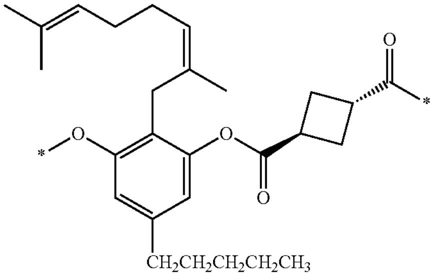
[*]OC1=C(C/C(C)=C\CC/C=C(C)\C)C(OC([C@@H]2C[C@@H](C([*])=O)C2)=O)=CC(CCCCC)=C1
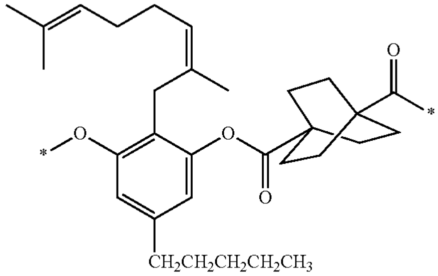
O=C(OC1=CC(CCCCC)=CC(O)[*])=C1C/C(C)=C\CC/C=C(O)\C)C23CCC(CC3)(C([*])=O)=CC2
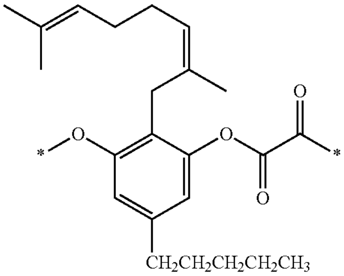
O=C(C([*])=O)OC1=CC(CCCCC)=CC(O)[*])=C1C/C(C)=C\CC/C=C(C)\C
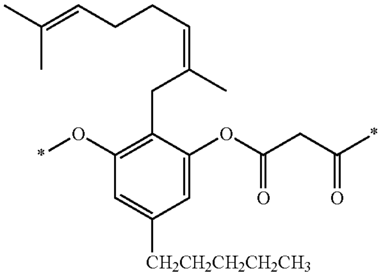
O=C(CC([*])=O)OC1=CC(CCCCC)=CC(O)[*])=C1C/C(C)=C\CC/C=C(C)\C -continued
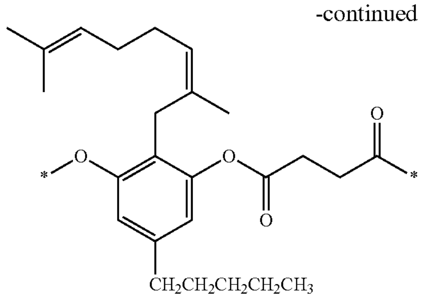
O=C(CCC([*])=O)OC1=CC(CCCCC)=CC(O)[*])=C1C/C(C)=C\CC/C=C(C)\C
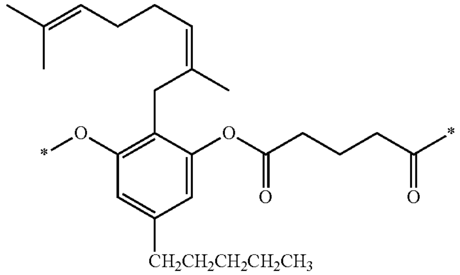
O=C(CCCC([*])=O)OC1=CC(CCCCC)=CC(O[*])=C1C/C(C)=C\CC/C=C(C)\C
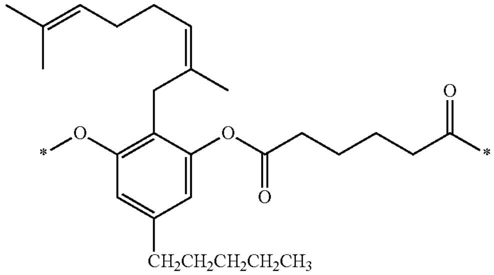
O=C(CCCCC([*])=O)OC1=CC(CCCCC)=CC(O[*])=C1C/C(C)=C\CC/C=C(C)\C
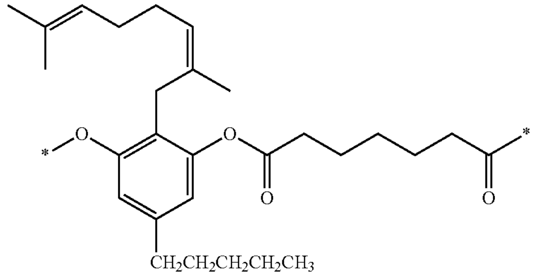
O=C(CCCCCC([*])=O)OC1=CC(CCCCC)=CC(O[*])=C1C/C(C)=C\CC/C=C(C)\C
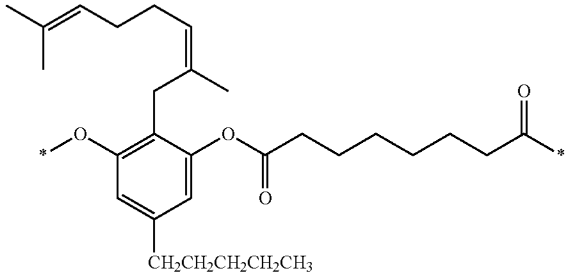
O=C(CCCCCCC([*])=O)OC1=CC(CCCCC)=CC(O[*])=C1C/C(C)=C\CC/C=C(C)\C -continued

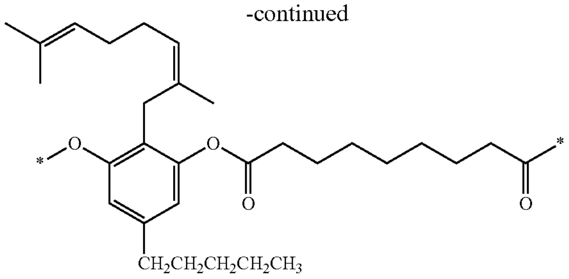

O═C(CCCCCCCC([*])═O)OC1═CC(CCCCC)═CC(O[*])═C1C/C(C)═C\CC/C═C(C)\C

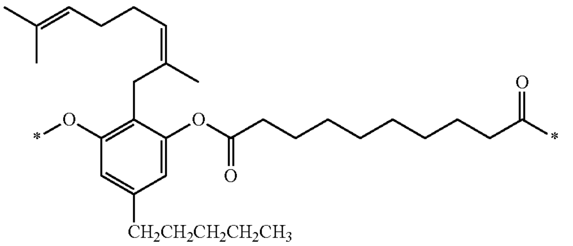

O═C(CCCCCCCCC([*])═O)OC1═CC(CCCCC)═CC(O[*])═C1C/C(C)═C\CC/C═C(C)\C

The antioxidant, degradation, and mechanical properties can be tunable based on the chemical structure of the polymer. These chemical structures include homopolymers with different cannabinoids and diacids as well as random copolymers that may include different cannabinoids and/or diacid units within the same polymer chain and block copolymers that include different cannabinoids and/or diacid units in different sections of a polymer chain. Homopolymers often have higher thermal stability and may be used in applications such as printed electronics, in which thermal processing steps require a substrate with good thermal stability. Certain polycannabinoid copolymers have low glass transition temperature and have been confirmed to have favorable properties as an adhesive for the skin.

Fillers in the Composites. Oxidation of metals is a classic challenge that impacts structural components as well as electronic components. The antioxidant properties of poly (cannabinoids) could allow them to act as effective coatings that limit the oxidation rate of structural metals such as steel as well as important electronic components such as copper.

Additive fabrication of printed electronics is highly sought as a method to reduce the amount of metal conductors that are used to fabricate devices such as circuit boards and to enable the development of flexible electronics. Printed electronics has historically used metals such as silver because of its oxidation stability. However, due to the high cost of silver, methods for printing copper are highly sought. The main challenge with copper inks is their susceptibility to oxidation. Composites of copper and poly(cannabinoids) could be used to improve the stability of inks.

Mixtures of polycannabinoids and metallic components includes any type of metal, including transition metals such as zinc, magnesium, copper, iron, nickel, tungsten, chromium and others as well as alloys and combinations thereof. In some examples, other metals, such as post-transition metals such as aluminum, lead, and tin and others as well as combinations thereof. The metals may fulfill a role in metabolic processes, and/or be provided for electrical, structural and/or mechanical purposes.

In certain embodiments, the metallic component of the composition may be provided in a particulate form of any size and shape, specifically as metal powder. Metal powders can be microparticles having average sizes in the micrometer range. In other embodiments the metal powders can be nanoparticles, having average sizes in the nanometer range nanometer.

In an embodiment, the metal is a biodegradable metal such as Ag, Al, Au, Ba, Be, Bi, Ca, Cd, Co, Cr, Cs, Cu, Fe, K, Li, Mg, Mn, Na, Ni, Pb, Pt, Ra, Rb, Sb, Sn, Sr, Ti, W, Zn, or a combination thereof. In a further embodiment, the metal is Ag, Al, Au, Ba, Bi, Ca, Co, Cr, Cs, Cu, Fe, Ge, K, Li, Mg, Mn, Mo, Na, Ni, Rb, Sn, Sr, V, W, Zn, Zr, or a combination thereof.

In an embodiment, the metal is Ag, Au, Cu, Fe, Ni, Pt, Zn, or a combination thereof.

The composition of polycannabinoid and metal particles can contain any volume fraction of metal particles. In an embodiment, the composition comprises polycannabinoid and metal particles, wherein the volume fraction of metal particles is greater than 0 to about 0.65, specifically about 0.01 to about 0.55, more specifically about 0.025 to about 0.50, yet more specifically about 0.05 to about 0.45, more specifically about 0.075 to about 0.40, more specifically about 0.10 to about 0.35, more specifically about 0.125 to about 0.30, more specifically about 0.15 to about 0.25, and more specifically about 0.175 to about 0.20.

Polycannabinoid—MXenes Composites

MXenes are emerging 2D electronic materials that have highly controlled nm-scale thicknesses and high surface areas. In addition to their electrical properties, MXenes are investigated for their exceptional mechanical properties and barrier properties. The high surface area of MXenes makes them susceptible to rapid oxidation. Composites comprising MXenes and polycannabinoids could leverage the antioxidant properties of polycannabinoids to control the oxidation rate of the MXenes. The most common MXenes ($Ti_3C_2T_x$) degrade to form benign degradation products of carbon and $TiO_2$.

MXenes are conductive 2D carbides, nitrides, and carbonitrides. MXenes have the general structure $Mn_{n+1}X_nT_x$, where M is an early transition element (Ti, V, Nb, and the like); X is C and/or N; n is 1, 2, 3 or 4; $T_x$ represents the surface terminations (typically —O, —OH, and —F), with n+1 layers of M covering n layers of X in the arrangement of [MX]~M.

The combined barrier properties of MXenes and the antioxidant properties of polycannabinoids could make these composites highly valuable for corrosion barriers. MXenes are known as one of the materials with the highest strength. Mechanical strength is one of the major drawbacks of many biodegradable polymers, especially the most widely-used Polylactic acid (PLA). Consequently, this composite strategy could provide biodegradable materials with exceptional mechanical properties. Lastly, the hydrophobic and antioxidant properties of polycannabinoids can be leveraged to limit the oxidation of MXenes until the polymer has degraded, enabling fully degradable electrodes with a specific degradation time.

Example Applications of Polycannabinoid—MXene Composites

| Application | Advantageous polycannabinoid properties | Advantage of Composite |
|---|---|---|
| Corrosion barriers | Antioxidant | MXenes provide physical barrier for oxygen and water diffusion; polycannabinoids provide antioxidant properties |
| Structural components | Antioxidant, mechanical, degradability | MXenes provide high mechanical stiffness and strength; polycannabinoids provide tailorable mechanical properties and protect the MXenes |
| Electrical conductors | Antioxidant, mechanical, degradability | MXenes provide high conductivity; polycannabinoids provide oxidation protection for the MXenes and both materials are degradable |

Figure 1A:
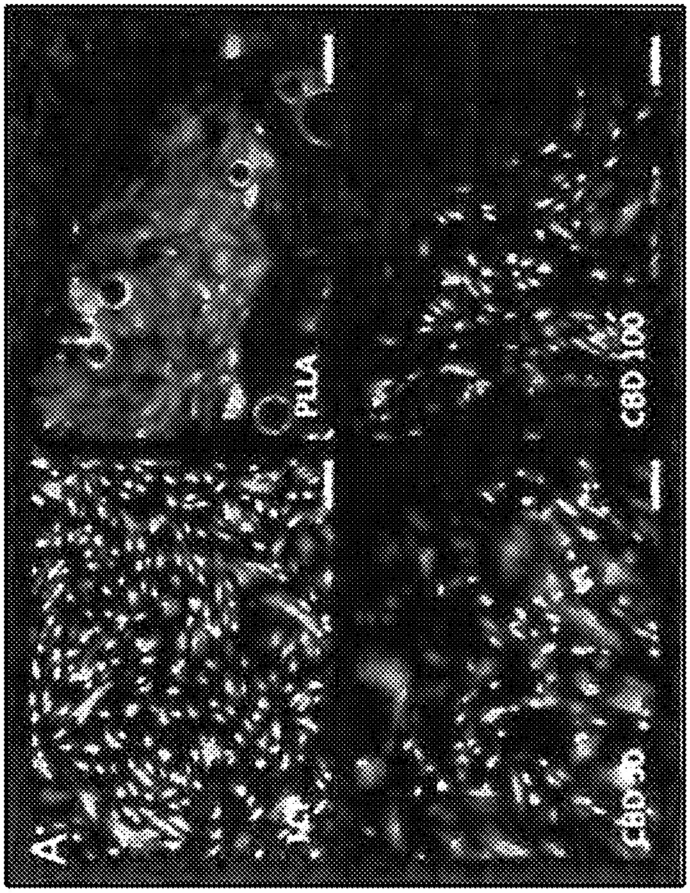
Figure 1C:
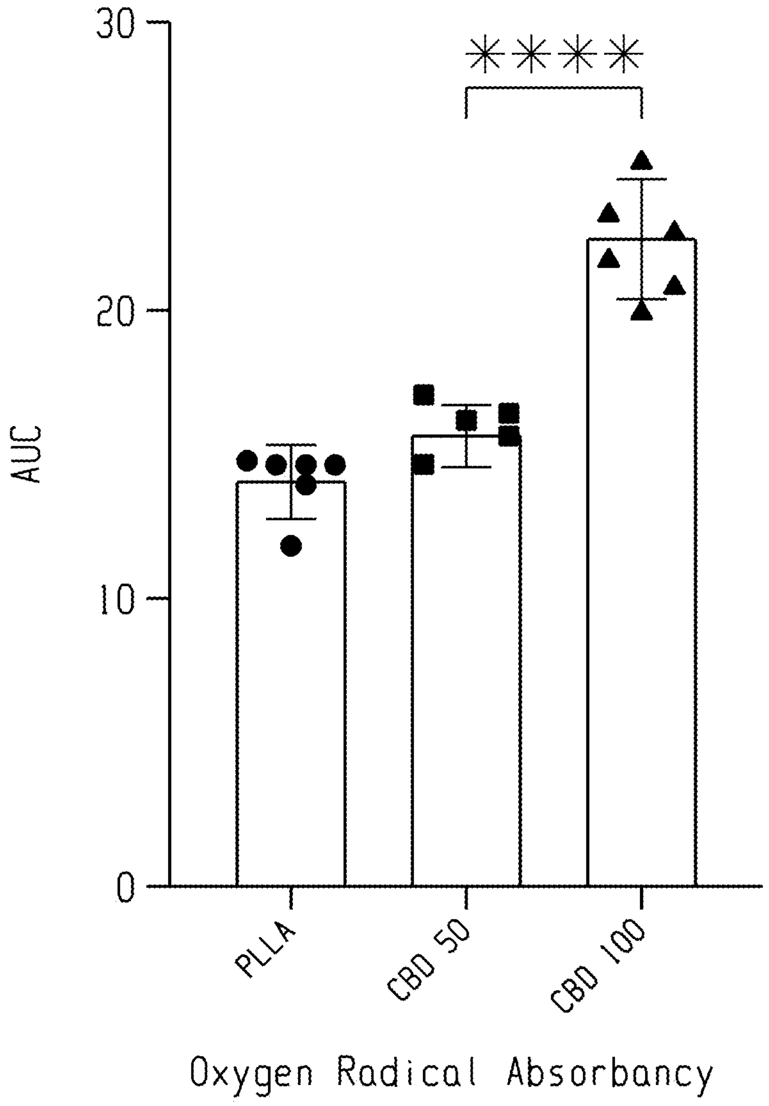
Figure 2:
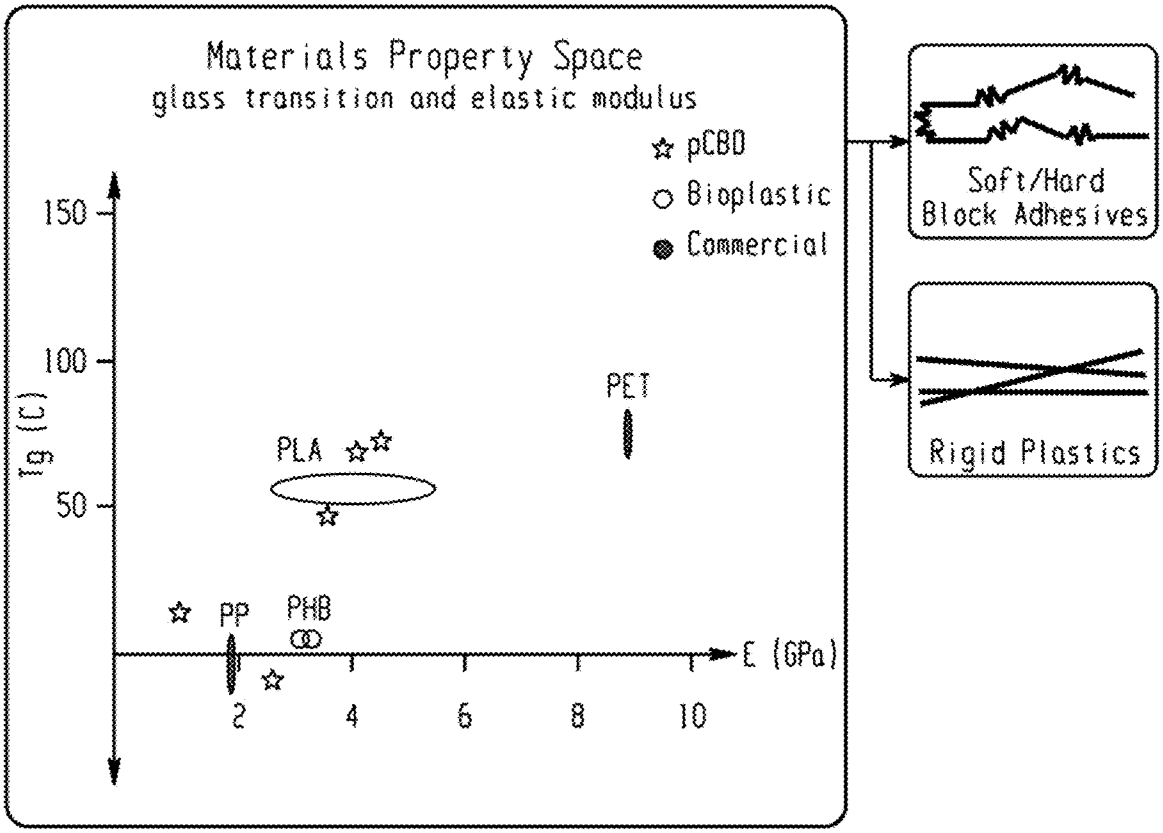
FIG. 2 and FIG. 3 are graphics depicting aspects of a process for preparation of conductive inks.
Figures 3A, 3B, 3C:
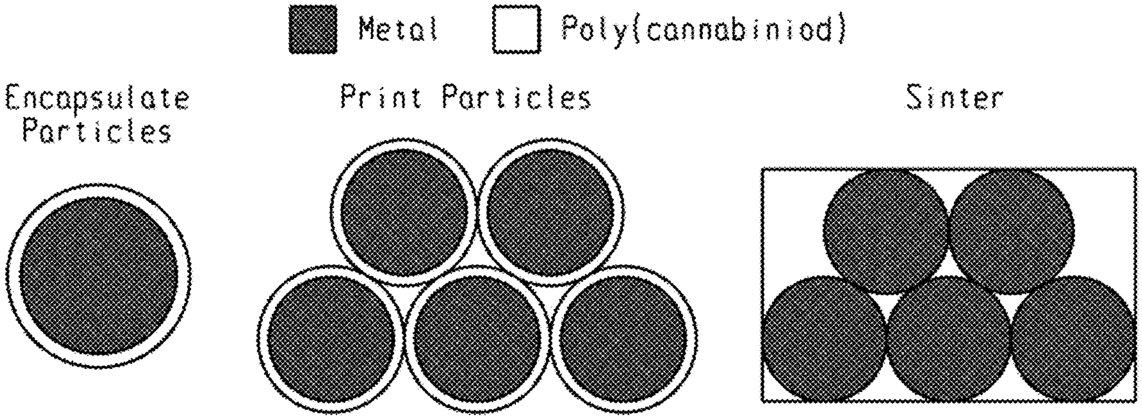
Figure 4:
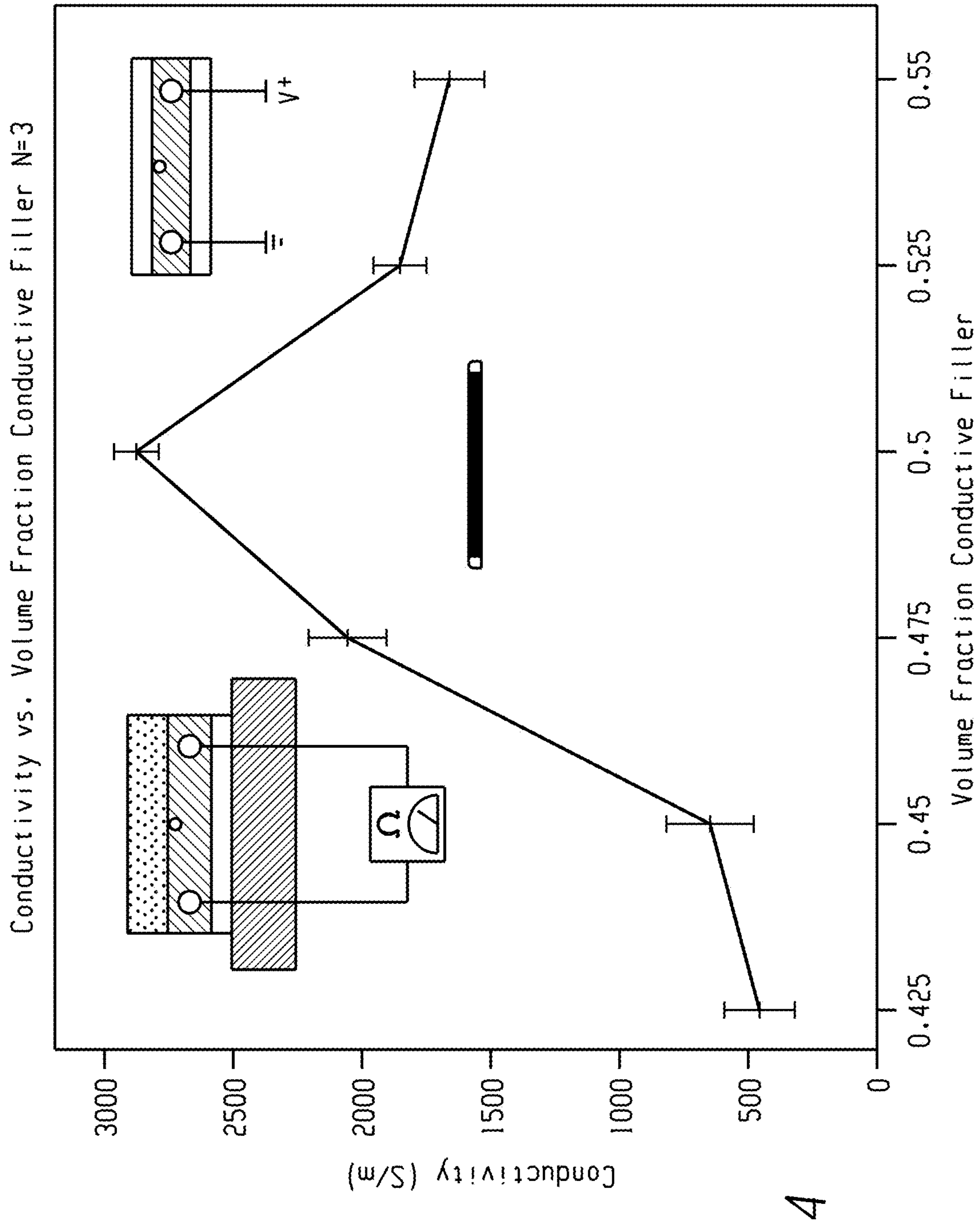
FIG. 4 is a graphic depicting aspects of conductivity for materials disclosed herein.
Figure 5:
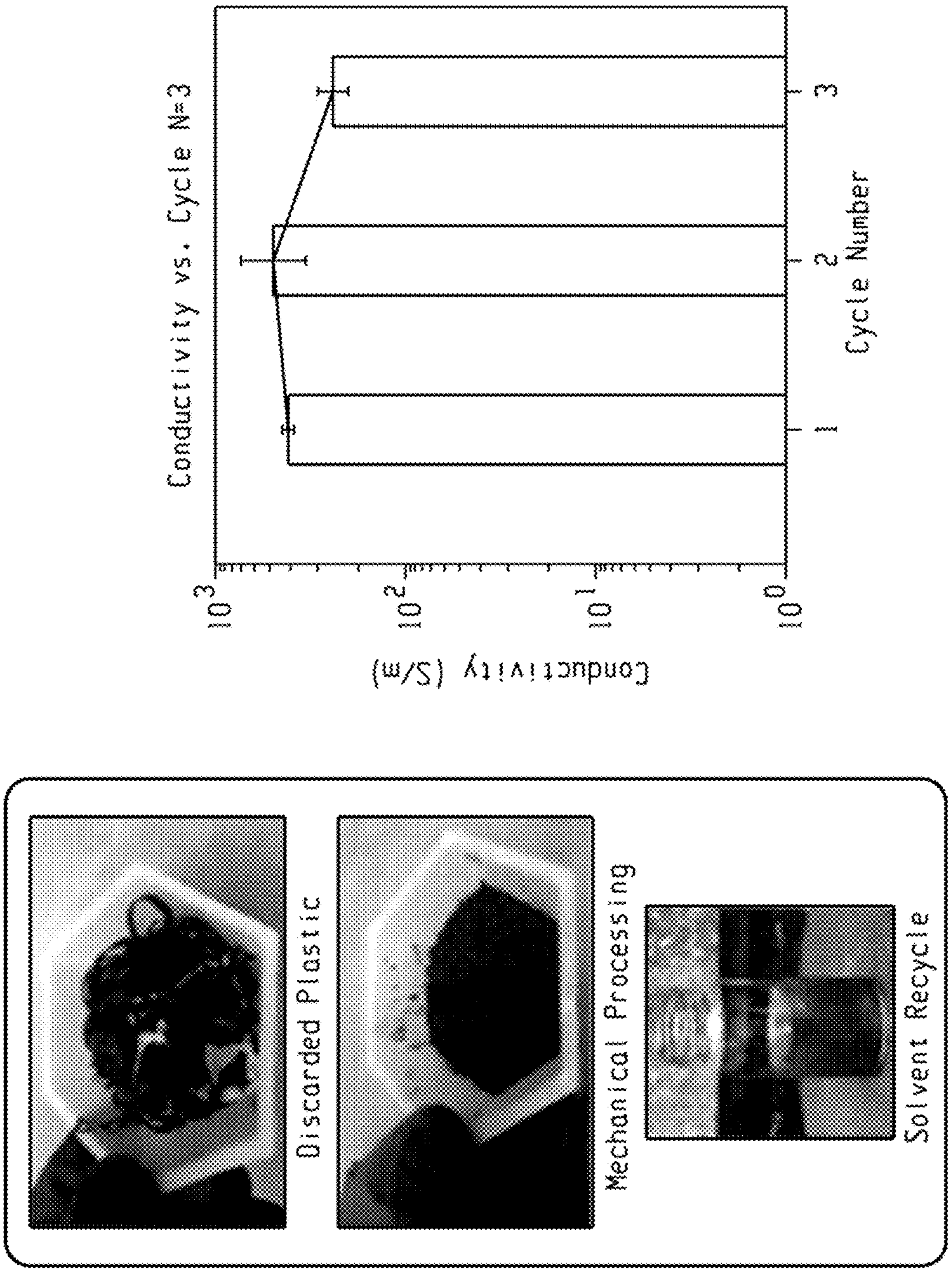
FIGS. 5 and 6 are graphics depicting aspects of electrical properties for materials disclosed herein.
Figure 6:
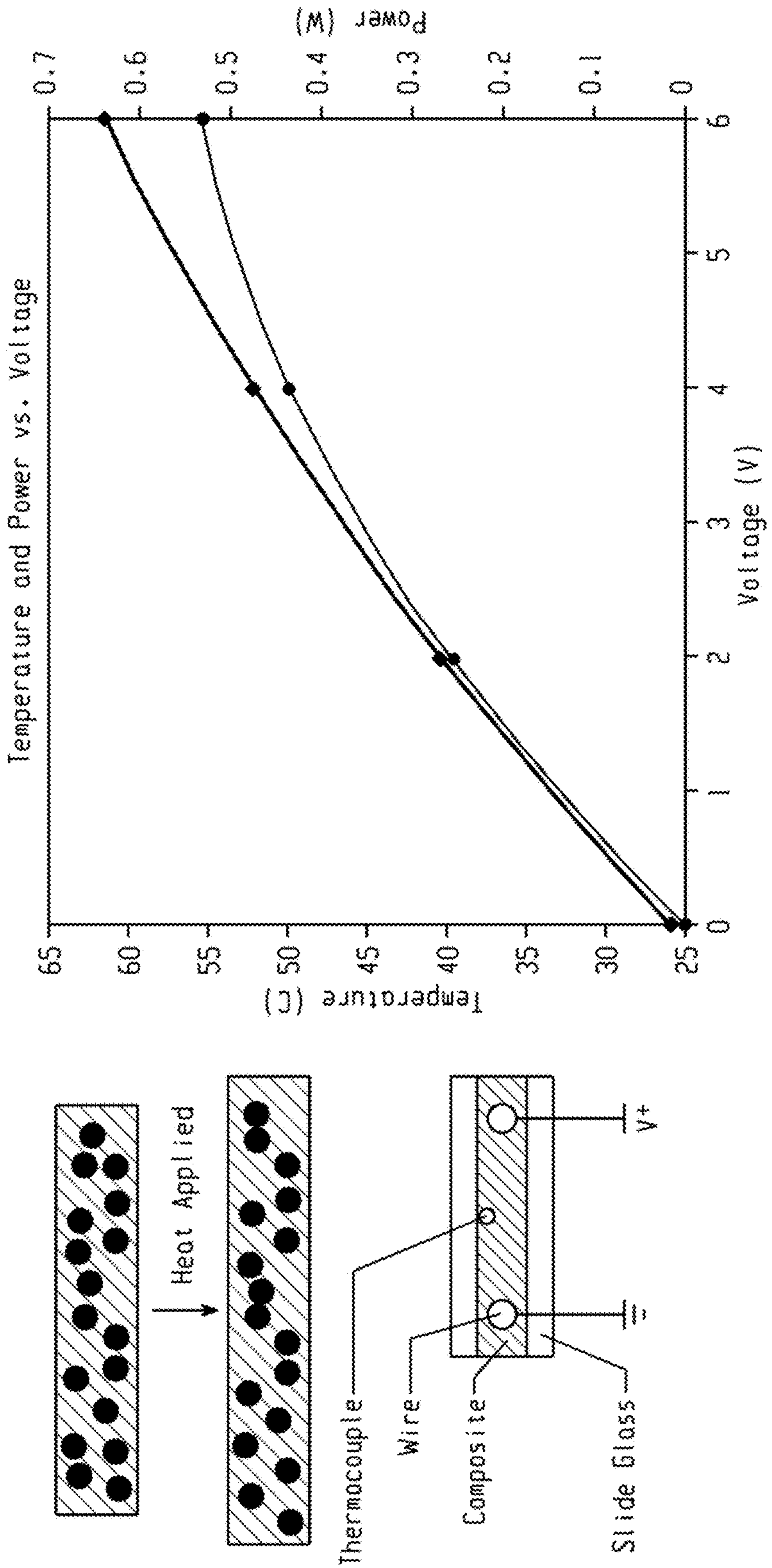
Figure 7:
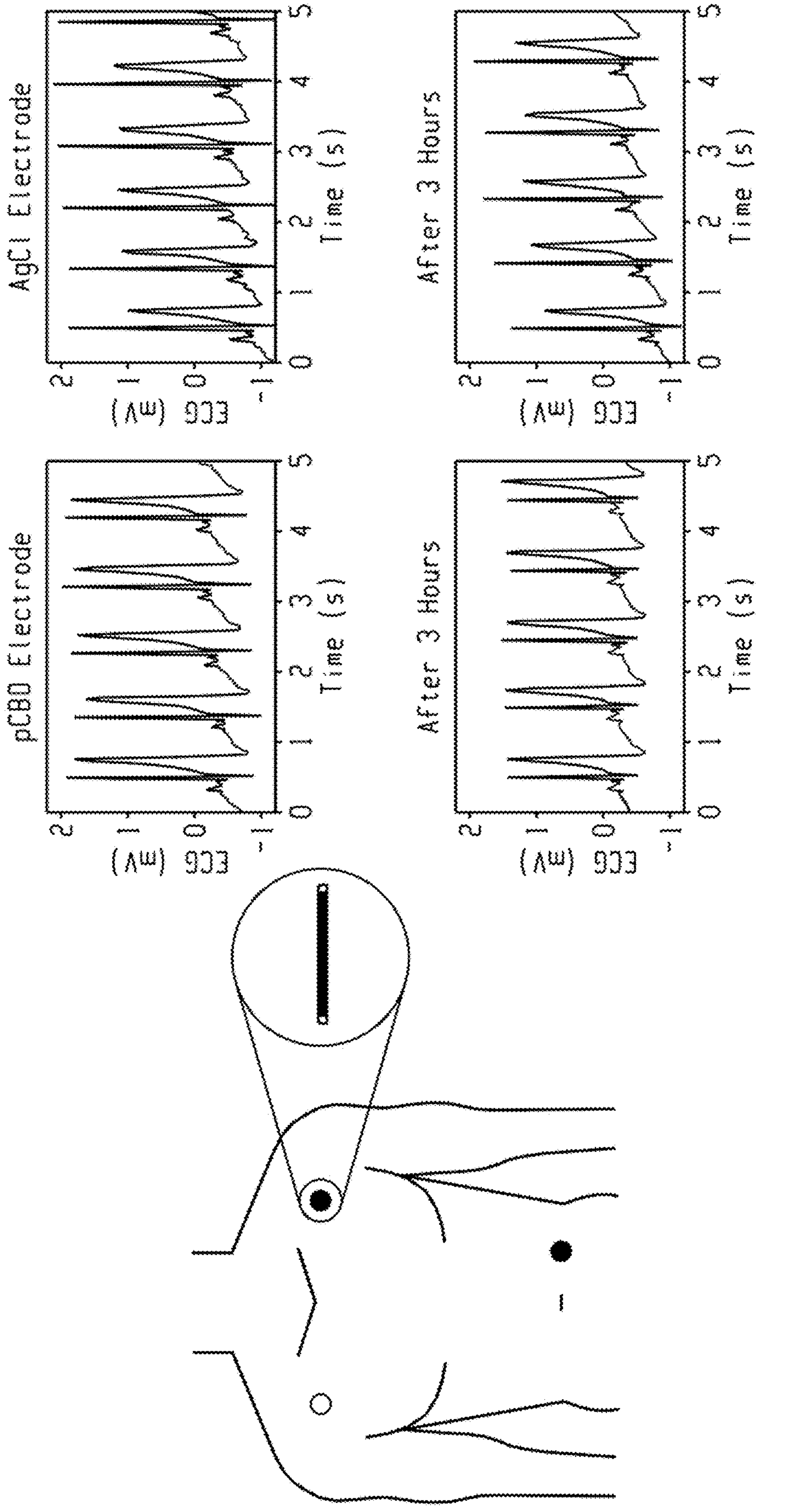
FIG. 7 is a depiction of a medical application making use of materials disclosed herein.

Referring to FIGS. 1A-1C are graphics depicting comparative data on cytotoxicity (FIG. 1A) and % metabolic activity (FIG. 1B) for the cannabinoid CBD compared to poly(L-lactide) (PLLA), and TCP; as well as a comparative evaluation of oxygen radical absorbency of CBD and PLLA (FIG. 1C). FIG. 2 is a graphic depicting ranges of glass transition and elastic modulus for potential polycannabinoid materials indicated as stars compared to commercial polymers polypropylene (PP) and polyethylene terephthalate (PET) and bioplastics polyhydroxybutyrate (PHB) and polylactic acid (PLA). FIG. 3 is a graphic depicting aspects of an exemplary process for the preparation of conductive inks using metal particles encapsulated in PolyCBD. In some of these embodiments, the particles are carried by a suitable solvent, such as methanol. FIGS. 4 and 5 are graphics depicting conductivity versus volume fraction of conductive filler and conductivity as a function of cycles for a composite of pCBD-Adipate containing tungsten microparticles. FIG. 6 is a graphic depicting electrical properties of a composite of pCBD-Adipate containing tungsten microparticles as a function of temperature. FIG. 8 is a graphic depicting comparative output for electrocardiogram (ECG) electrodes fabricated from AgCl (conventional) and a composite of pCBD-Adipate+tungsten microparticles (fabricated according to the teachings herein).

Having introduced aspects of mixtures of polycannabinoids and metallic components, some further aspects and applications are now introduced.

In some embodiments, the metallic component is mixed into a mixture of polycannabinoids through conventional additions while stirring. In some embodiments, emulsifiers are included in the mixture to aid in dispersal and distribution of the metallic component. Other techniques may be used alone or in combination with mixing, and may include, for example, sonication, shaking, sintering, extruding, jetting and by other techniques. A combination of techniques may be employed in order to accommodate, for example, various ranges of particle size distributions.

The compositions described herein can be solvent processable. In an embodiment, the compositions can be formed into a layer by combining the polycannabinoid, metal, and a solvent to form a mixture in the form of a dispersion or solution, and applying the mixture to a substrate via conventional processes including flow coating, ink jet printing, screen printing, roll to roll printing processes, reel to reel processing, spin coating, meniscus and dip coating, spray coating, brush coating, doctor blade application, curtain casting, drop casting, and the like.

Suitable solvents may include a liquid aprotic polar solvent such as propylene carbonate, ethylene carbonate, butyrolactone, acetonitrile, benzonitrile, nitromethane, nitrobenzene, sulfolane, dimethylformamide, N-methylpyrrolidone, or the like, or a combination thereof. If appropriate, polar protic solvents include, for example, water, methanol, ethanol, propanol, isopropanol, butanol, or the like, or a combination thereof. Other non-polar solvents such benzene, toluene, methylene chloride, carbon tetrachloride, hexane, diethyl ether, tetrahydrofuran, or the like, or a combination thereof may also be used.

Advantageously, polycannabinoids can prevent and/or reverse oxidation of the metallic component.

In some embodiments, additional materials, such as fibers that are biocompatible are included in the mixture. Other nanoparticles and nanoforms of materials may be included in the mixture. For example, various carbon nano-forms (graphene, nanotubes and similar forms) may be incorporated into the mixture. A mixture may be controlled to exhibit hydrophilic or hydrophobic properties.

In some embodiments, the mixture exhibits a viscosity compatible with ink. In some of these embodiments, the mixture may be useful for printing as a conductive, biocompatible ink. The ink may comprise the polycannabinoid and metal, and optionally further comprise a solvent or liquid carrier, a pigment, an extender, a rheology modifier, an additive, or a combination thereof.

In an embodiment, a method of forming a conductive composite comprises encapsulating a particulate metal with a polycannabinoid to form an encapsulate; optionally applying the encapsulate to a substrate; and sintering the encapsulate to aggregate the metal particles to form a conductive composite. Further within this embodiment, the encapsulate is formulated as an ink and applied to the substrate via a printing process.

In some embodiments, a mixture of polycannabinoid (e.g. PolyCBD) and metal is adapted for use as a biomedical implant. For example, a mixture of polycannabinoid (e.g. PolyCBD) and silver may be adapted for use in dentistry. Advantageously, the polycannabinoid (e.g. PolyCBD) component inhibits oxidation of the silver, enhancing antibacterial and appearance properties of the silver.

In some embodiments, a mixture of polycannabinoid (e.g. PolyCBD) and metal is adapted for delivery of therapeutics. For example, the mixture may be tuned for slow biodegradation and gradual release of magnesium, some other nutrient, a drug, or other therapeutic.

In some embodiments, a mixture of polycannabinoid (e.g. PolyCBD) and metal is adapted for use in electronic circuitry. For example, the mixture may be provided in a form that is useful for replacing copper paste, solder, or other elements of an assembled circuit.

In some embodiments, a mixture of polycannabinoid (e.g. PolyCBD) and metal is adapted for use in military or intelligence gathering. For example, the mixture may be formed into field devices such as antenna. In some of these embodiments, the antenna or other devices may be disposed for clandestine use at an end-use location without a requirement for subsequent recovery. In some embodiments, the mixture may be included in at least some aspects of armaments, thus reducing future environmental impact as fragments dissolve into the environment.

In some embodiments, a mixture of polycannabinoid (e.g. PolyCBD) and metal is adapted for use in robotic devices. In some embodiments, a mixture of PolyCBD and metal is adapted for use as a surface treatment for another device or article. For example, the mixture may be applied as a coating.

Conjugated polymers. Conjugated polymers can be used as conducting or semiconducting components of electronic devices, and have advantages such as stretchability and solution processability. One of the challenges with organic electronics is their susceptibility to environmental conditions. For example, many organic semiconductors can become doped by oxygen. Composites of conjugated polymers with structural polymer such as polystyrene have shown some benefits for improving electrical properties and reducing the effect of environmental exposure. Due to their exceptional antioxidant properties, polycannabinoids may have improved protective effects for the embedded conjugated polymers. Polycannabinoids could also provide degradability. The wide range of mechanical properties of polycannabinoids could enable conjugated polymer composites that range from high-modulus flexible materials to low-modulus stretchable materials. Stretchable blends of conjugated polymers have so far only been reported for petroleum-derived non-degradable polymers. Stretchable degradable composites could be created by using block copolymers of polycannabinoids and conjugated polymers.

Biologically active components. Some biologically active components, such as enzymes, biocatalysts, and antibodies, can be susceptible to damage from the environment. Protecting these biologically active components can be useful for biosensing or therapeutic applications. Encapsulation of biologically active components in degradable polymers enables their controlled release as the polymer degrades.

Polymer Properties. The most common degradable polymers consist of condensation polymers with ester linkages between monomers. Most common monomers include lactic acid, caprolactone, and hydroxyalkanoates. However, these polymers have a limited range of mechanical and processing properties. Most importantly, the most widely used biopolymer, poly(lactic acid), requires special circumstances to degrade, including preprocessing to reduce the molecular weight and composting in a special facility. The degradation products of these polymers are often acidic and/or cause inflammation.

The large number of cannabinoid monomers provide a wide range of mechanical properties for different compositions of poly(cannabinoids). Poly(cannabinoids) degrade naturally in common environmental conditions without any special conditions and produce anti-inflammatory factors during the degradation process.

Loading of anti-inflammatory and anti-oxidant components. For biomedical applications such as implantable electronics, the release of the antioxidants can reduce inflammation that often accompanies the surgical implantation process. Existing degradable polymer compositions for implantable devices sometimes use typical degradable polymers such as polycaprolactone and add several weight percent of antioxidant molecules. In contrast, the poly (cannabinoids) incorporate antioxidants into the backbone of the polymer. For a polymer such as poly(cannabidiol-adipic acid), the polymer is intrinsically ~75 wt % cannabidiol, which is a natural antioxidant. As the polymer degrades, these antioxidants are released at the site of implantation. One of the potential target applications for the composite materials in this patent is implantable devices, where this high content of antioxidant will be an important asset.

Barrier properties of the polymer. The ideal encapsulant for implantable electronics should limit water penetration to the underlying active electronics and should degrade at the surface. The most common material used as encapsulants for implantable electronics is silk. However, silk requires a very complex set of processing conditions to remove ions and achieve a crystalline structure after deposition that leads to an appropriate degradation time constant. Poly(cannabinoids) are simpler to source and process, and the large diversity of different polymers are expected to allow tailored degradation rates that do not depend on crystallization kinetics.

Degradation methods. In many applications, the degradation of the composites is a key feature of their functionality. These applications include implantable electronics, disposable point-of-care sensors, wearable health monitoring devices, wearable therapy devices, and disposable sensors for the internet of things (IoT). Inside the body, poly (cannabinoids) degrade to form cannabinoids, which are natural anti-inflammatories and painkillers. For disposable devices such as medical devices used outside of the body and IoT sensors, devices may be intentionally recycled or they may be unintentionally disposed in the environment. When disposed of in the environment, poly(cannabinoids) degrade to form natural and benign degradation products. The quantity of acid produced by the degradation of poly (cannabinoids) is ~35% of the acid produced from the degradation of PLA. Poly(cannabinoids) can be quickly and intentionally degraded using bases like ammonium hydroxide. In devices that include magnetically active particles such as Fe, magnetothermal heating could be used to rapidly degrade the materials.

The following examples are merely illustrative of the polycannabinoid based compositions and uses disclosed herein and are not intended to limit the scope thereof.

EXAMPLES

Example 1. Poly(cannabidiol terephthalate) (pCBDT) Synthesis 3.93 grams (g) of cannabidiol and 1 g of sodium hydroxide was dissolved in 80 milligrams (mg) of deionized (DI) water. After stirring 25 mg of tetrabutylammonium bromide was added and the solution changed to a dark purple color. 2.53 g of terephthoyl chloride was dissolved in 30 milliliters (ml) of dichloromethane and was added to the aqueous solution. The reaction was run for 10 minutes and then quenched with acetone. The precipitated polymer was purified using 10% hydrochloric acid and reprecipitated in cool methanol. The polymer product was characterized through NMR, GPC, DSC, TGA analysis. The chemical structure of pCBDT is as follows:

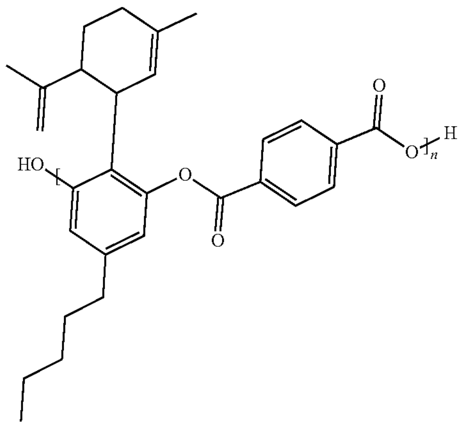 [SMILES: C=C(C)C1CCC(C)=CC1c1c(O)cc(CCCCC)cc1OC(=O)c1ccc(C(=O)O)cc1]

Example 2. Rapid Synthesis of Poly(CBD Terephthalate)

Materials—Cannabidiol (CBD) was purchased from Eco-Gen BioSciences, terephthaloyl chloride, dichloromethane (DCM), cetrimonium bromide (CTAB), and Benzyltriethyl-ammonium chloride (BTEAC) were purchased from Fisher Scientific. Sodium hydroxide (NaOH), and tetrabutylammonium bromide (TBAB) were purchased from Sigma Aldrich. All chemicals were used without further purification. $^1$H NMR was collected using a Bruker AVANCE 500 MHz instrument. Thermo Gravimetric Analysis was conducted using a TA Instruments TGA Q-500, and DSC was collected using a TA Instruments DSC Q-20. GPC was taken using a WATERS GPC equipped with a 1515 HPLC Pump and Waters 717Plus Autoinjector. UV measurements were done using an Agilent 5000 Varian Cary 5000 UV/VIS/NIR Spectrometer.

Synthesis via a phase transfer catalyzed polymerization technique.

Aqueous phase composition: The reaction was carried out in a 250 ml round bottom flask to which 80 ml of distilled water and 0.025 moles of NaOH were added. To this, 0.0125 moles of CBD were added and stirred vigorously until the solution turned dark purple. Further, 25 mg of phase transfer catalyst (CTAB) was added.

Organic phase composition: In a 100 ml Erlenmeyer flask, 0.0125 moles of terephthaloyl chloride were well dissolved in 35 ml of dichloromethane.

Polymerization: The organic phase was dropped into the stirring aqueous phase, and the reaction was underway. After 10 minutes, the stirring was stopped, and the polymer formed in the organic phase. The organic phase was then separated using a separation funnel and the polymer was precipitated in excess of cold methanol. The polymer was washed once with water and then once with acetone to remove the unreacted compounds. The polymer was dried overnight in a closed vacuum at 70° C. to remove the solvent and water.

Polymer P3—(5.96 g, 92% yield). Mn 25,102 g/mol, Mw 57,735 g/mol, PDI 2.3. $^1$H NMR (500 MHz, $CDCl_3$): δ (ppm): 8.36 (s, 4H), 6.98 (s, 2H), 5.35 (s, 1H), 4.67 (s, 1H), 4.53 (s, 1H), 3.67 (d, 1H), 2.70 (m, 2H), 1.56-1.80 (m, 10H), 1.39 (m, 4H), 1.29 (s, 3H), 0.94 (t, 3H).

The efficiencies of a few commercially available quaternary ammonium salts in the phase transfer catalyzed polymerization to form polycannabinoids were tested (Table 1).

TABLE 1

Variation of molecular weight (Mn) with changing phase-transfer catalysts.

| Polymer | Phase-Transfer Catalyst | Polymer Yield (%) | Mn | PDI |
|---|---|---|---|---|
| P1 | Tetrabutylammoniam bromide (TBAB) | 95 | 47,000 | 1.87 |
| P2 | Benzyltriethylammonium chloride (BTEAC) | 88 | 23,000 | 2.1 |
| P3 | Cetrimonium bromide (CTAB) | 92 | 25,100 | 2.3 |

CBD was polymerized with terephthaloyl chloride via a phase transfer catalyzed polymerization technique. In a NaOH aqueous phase, CBD forms a dianion with sodium and is well solubilized in the alkaline environment within minutes. Furthermore, in the presence of a quaternary ammonium salt, this dianion is readily coordinated to form an ionic complex that is easily transferred to an organic phase. The organic phase in this reaction contains terephthaloyl chloride in dichloromethane and is where the polymerization reaction occurs. After transfer to the organic phase, the phase transfer catalyst drives the reaction equilibrium forward by coordinating with the chloride leaving group and drawing it to the aqueous phase, where the chloride ion is dissolved, and the quaternary ammonium cation can coordinate with another CBD dianion to start the phase transfer catalysis again. The ability of the phase transfer catalyst to facilitate the transfer of anions back and forth across the interface allows for a high polymerization yield and molecular weight. Quaternary ammonium salts make favorable phase transfer catalysts due to their low toxicity, low cost, biodegradability, and the ability to wash most of them away from the reaction product by extraction with water. The efficiencies of a few commercially available quaternary ammonium salts were tested (Table 1), and polymerization using tetrabutylammonium bromide produced the highest molecular weight.

The reaction is energy-efficient and rapid, reaching completion in less than 10 minutes at ambient temperature and pressure, largely due to the enhanced nucleophilicity of CBD as a dianion and the aid of vigorous stirring to maximize the interfacial surface area. Thus, this phase transfer catalyzed polymerization offers technical benefits over traditional synthetic approaches like solution polymerization which may require several days to reach completion and melt polymerization which often requires the use of rare or toxic metal catalysts. The high biomass content in the polymer is evident as CBD contributes to about 67% by mass of the final polymer. Free-standing films of PCBDT displayed excellent transparency and were further used for dielectric characterizations.

The successful synthesis of the PCBDT was confirmed using $^1$H NMR. The NMR spectrum for CBD shows two phenolic hydrogen peaks, one at 6.00 ppm and the other overlapping with peaks between 4.5-5.00 ppm. Upon polymerization, the two phenolic peaks disappear, while the aromatic hydrogens of CBD shift downfield as the phenol functionalities around them change to more electron-withdrawing ester functionalities. The differential scanning calorimetry (DSC) results show that PCBDT exhibits a Tg of 164° C., while thermal gravimetric analysis (TGA) yields a thermal decomposition temperature of approximately 377° C. PCBDT shows a higher Tg than several commercial polyesters and bisphenol A-based polycarbonates, which is mainly attributed to the rigid aromatic structure of both monomers together with the bulky side groups on CBD. The alicyclic limonene unit of CBD that is separated from its aromatic group can further enhance the rigidity without increasing the conjugation of the structure.

A sessile drop method was used to measure the water contact angle of a PCBDT film. The average of four sets of results shows a water contact angle of 91° making it a hydrophobic polymer film. The inherent hydrophobicity of PCBDT is a result of the excess aliphatic character of the CBD monomer which increases the hydrophobic nature of the polymer formed. The bulky side chains of CBD are unlike any of those found in commercial monomers, giving it a unique character. Due to a higher water contact angle, PCBDT films are more repellent to moisture than PET (water contact angle of 72.5° C.), polystyrene (water contact angle of 82° C.), and several other commercial dielectric polymers.

Preparation of polymer films: 10 wt. % of PCBDT in tetrahydrofuran (THF) solution was prepared and kept on stirring for at least 4 hours. Films were cast on a glass substrate having a smooth surface, by using a motorized drawdown coater. The doctor blade was set to an initial casting thickness of 380 m. After drying the casted film for 4 hours at 25° C. it was removed from the glass plate using DI water to give a free-standing film. The obtained free-standing film was further dried under vacuum at 70° C. for 24 hours. The dried films were flexible and had a thickness of around 10-12 microns.

High Field Displacement-Electric Field Loop Measurement: The electric displacement-electric field (D-E) loops were assessed using a customized Sawyer-Tower polarization loop tester, which utilized a unipolar positive half sinusoidal wave at 100 Hz. The measurement apparatus was a Trek Model 10/40 10 kV high voltage amplifier in conjunction with an OPA541 operational amplifier-based current-to-voltage converter. To ensure proper contact between the electrodes and the film, gold/palladium electrodes measuring 3 mm in diameter were deposited on both sides of the film using the sputter coating technique.

Dielectric Spectroscopy: Dielectric spectroscopy measurements were conducted using a Solartron SI 1260 frequency response analyzer paired with a Solartron 1296 dielectric interface. The tested sample was housed within a test cell and exposed to controlled temperature conditions regulated by a Delta Design 9015 temperature controller. This controller ensured exceptional temperature stability, keeping fluctuations within a narrow range of 0.5° C. throughout the entire measurement procedure. Gold/palladium electrodes, with a diameter of 30 mm, were applied to the sample to facilitate intimate contact between the electrode and the dielectric during the measurement.

Breakdown Tests: The breakdown strength of the films was tested using the high-voltage power supply PS365 with a voltage ramping rate of 500 V s-1.

Surface pressure vs. Mean Molecular Area (π-MMA) isotherms, rheology, and microscopy setup for Langmuir degradation experiments: Langmuir isotherms (2D films or monomolecular films) were recorded on a polytetrafluoroethylene medium-size Langmuir trough (Area=243 $cm^2$ KSV NIMA, Finland), filled with 170 ml water and equipped with a pair of Delrin barriers for controlling the mean area occupied per repeating unit (MMA) and a custom-made subphase evaporation compensation tool. Alternatively, a high compression trough with about twice the area and subphase volume was used. The changes in the surface tension (surface pressure π) of the air-liquid interface upon forming and compressing the monolayer were monitored by a Wilhelmy plate microbalance and recorded as a function of the MMA (lower MMA means more compressed film). Rheology experiments at the Air-Water interface were carried out with an interfacial shear rheometer (IRS, model MCR502) from Anton Paar (Austria), which consists of a biconical disk coupled to a driving motor and a torque and normal force transducer unit. The edge of the bicone is placed in the interface in the middle of the trough. The bicone had a radius of r=25.5 mm. The angle of its tip was 166.8°. Measurements were carried out at a defined strain of 0.1% and an oscillation frequency of ω=1 Hz. The dynamic moduli were recorded as a function of time and polymer surface pressure. The storage modulus (G') accounts for the elastic component and the loss modulus (G") for the viscous component of the response to oscillatory shear.

Microscopic images of the layer at the water surface with a maximum image size of 720×400 μm2 were obtained using a Brewster Angle Microscopy (BAM). The device was a Nanofilm Ultrabam (Accurion, Gottingen, Germany). A 658 nm class IIb laser source with a lens and a CCD camera (1360×1024 pixels) were used to take all micrographs, with a resulting the lateral resolution of ~2 μm.

Thin-film Characterization: PCBDT solutions were prepared in chloroform at a concentration of ca. 0.25 mg/ml. For each experiment, around 60 μL of $CHCl_3$ solution (15 μg polymer) was spread dropwise on top of the water (air-water interface). The chloroform was allowed to evaporate for 30 min while the polymer monolayer was formed at the interface. Then, the layer is laterally compressed with the barriers at constant a compression rate of 5 mm/min. The mean molecular areas per repeating unit (MMA) for the films were calculated based on the mass of the film (15 μg), on the average weight of a repeating unit (determined by summing up the weight of the co-monomers multiplied by their molar fraction=444 g/mol for CBD-terephthalate) and the surface area of the trough during compression. All isotherms were recorded at 21° C.±0.5. The data are reproducible with a random measurement error of ~5% concerning the surface pressure or the MMA values of the compression curve for the independently repeated experiments.

PCBDT films were formed by spreading the polymer from a chloroform solution at the surface of water (air-water interface) at pH ~6 and 21° C., and the molecular arrangement of the polymer chains was measured upon lateral compression. As evidenced in the compression isotherm (constant temperature), and in the Brewster angle microscopy images taken at different points of the isotherm, PCBDT forms slabs right after spreading. This implies that the intermolecular forces are of a similar magnitude as the spreading force generated by the high surface energy of water, which intercedes the even distribution of molecules and generates the slabs. Similar behavior has been observed with PET, however here the closed film is observed at an area per molecule that is 6 times greater than in the case of PET. The high MMA suggests that the slabs are of monomolecular thickness, which is corroborated by AFM images of the transferred film. After stabilization, the polymer layer is compressed at a constant speed, increasing the contact points between the slabs, and thus the surface pressure of the system. The slabs encounter each other and merge forming a homogenous monolayer upon compression. The isotherm shows a distinct kink at a surface pressure (SP) of about 13-15 mN/m which suggests a phase transition. The transition is also observed as an increase in the shear storage modulus (G'), i.e., the elastic part of the shear response, which was recorded by an interfacial rheometer at an area per repeating unit of 70 Å. Considering that the polymer repeating unit has a length of about 12 Å, the average. distance between the chains is about 6 Å at that point, which is quite a bit larger than the van der Waals radius of 3.5 Å as the typical interchain spacing of polymers. That the distance is larger for PCBDT is expected given the bulky side groups. This means that the solidification of the film occurs in the monolayer state when the side groups start to interdigitate. Usually, chains need to overlap and form entanglements for a polymer Langmuir film to display shear resistance. Not wishing to be bound by theory, this unique behavior is attributed to the outstanding molecular stiffness and high bulk Tg of PCBDT. In comparison, due to its lower bulk Tg, PET solidifies at room temperature at a thickness of ~2 nm, corresponding to about 6 layers.

Degradation experiments were carried out using a medium and high-compression trough setup as explained above. The films at the A-W interface were formed and compressed to the degradation surface pressure, which should be close to the point in the compression isotherm with the greatest slope. "Long-term" hydrolytic degradation experiments were performed on a water subphase at pH 6. The degradation surface pressure for PCBDT was 14 mN/m. When polymer degradation products leave the surface and are solubilized in the subphase, the surface pressure decreases, and the barriers compress the film to compensate for the loss. The initial film area vs. final area is used to calculate the mass loss ($A/A_0$)%. For accelerated degradation with potassium hydroxide (KOH) pH 12 or hydrogen peroxide ($H_2O_2$) 3% (oxidative degradation according to ISO standard 10993-13), the films were prepared on the water, and after a few hours of stabilization, KOH (pH 14) or $H_2O_2$ (35 wt %) solutions were injected under the films to adjust concentration/pH.

Hydrolysis of PCBDT: End of Life (EoL) behavior is an important property for the next generation of synthetic and biobased polymers. While all polyesters can in principle be depolymerized through hydrolysis, the required conditions can be so harsh that they have to be considered as environmentally stable, as is the case for PET. Due to its hydrolysis resistance, PET is also not yet depolymerized on a commercial scale, despite its immense economic importance.

Langmuir monolayer degradation (LMD) experiments, previously used to unravel depolymerization mechanisms of (bio)catalysts on PET, were used to study the molecular degradation kinetics of PCBDT in the presence of different catalysts ($OH^-$, $H_2O_2$), and benchmarked the degradability of PCBDT against PET. The first step for LMD is to characterize the assembly or deposition of the polymer of interest on a liquid surface into 2D thin films, to replicate the surface layer of a bulk material. Then, the films are subjected to hydrolysis by mixing the catalyst with the liquid below the films. This hydrolysis is monitored in situ by changes in the area occupied by polymer molecules (mass loss) and modification of the rheological properties of the films using interfacial rheology.

Langmuir Degradation Experiments: PCBDT films were prepared at an SP of 14 mN/m and monitored by surface area changes and interfacial rheology. At 14 mN/m, the storage modulus is above the loss modulus, indicating a solid-like layer. After around 20 hours, no significant changes were observed either in the storage modulus or the area of the film and the film was tested for alkaline degradation. After injection of KOH to obtain a pH of 12.3, the area of the film decreased to a mass loss of 60% in a two-stage process. First, the polymer surface pressure increased, a phenomenon that is commonly observed when increasing the pH below the films of polymers that are prone to alkaline hydrolysis as these molecules swell once the pH is above the degradation threshold. The storage modulus decreased due to the breakage of the polymer chains into shorter chains, which, however, were not yet small enough to be solubilized in the subphase (from time 10 min to 30 min). 15 minutes after KOH injection, the complex interfacial viscosity was on the same level as bare water, indicating that the molecular mass of the polymer was so low that it could not impart any shear resistance. This stage was followed by a fast decrease in the area when the barriers compensated for the desorption of degradation fragments from the surface. The maximum area reduction allowed by the experimental setup correlated to 60% mass loss, due to the space occupied by the rheometer's bicone. Based on the almost linear mass loss curve, it is justified to extrapolate that the layer will be completely dissolved within 1 hour at pH=12.3. For comparison, alkaline degradation of PET is typically carried out at pH 14 and 100° C., where complete degradation takes several hours.

Comparison of PCBDT and PET susceptibility to oxidative degradation: To simulate the -long-term stability of PCBDT for applications involving high temperature and air contact, its stability against oxidation was tested. After the films were formed as mentioned before, 35 wt % $H_2O_2$ was injected to reach a final concentration of 3 wt %. Almost instantly, the interfacial viscosity started decreasing, indicating chain cuts. The surface pressure increased similarly as in the case of KOH addition, which is attributed to a greater swelling of the polymer due to the hydrophilic groups formed by oxidation. After 20 hours, water-soluble fragments started forming and solubilizing in the aqueous phase, leading to a decrease in the area by 60% (maximum area loss allowed by the experimental setup). Interestingly, the decrease in interfacial viscosity was greatly accelerated by an increase in temperature (factor 10), while the rate of mass loss was only about doubled. A pronounced lag time was observed between the loss of interfacial viscosity and the onset of mass loss. Not wishing to be bound by theory, this result may relate to the hydrophobic nature of CBD, which is barely water-soluble, requiring pronounced chain fragmentation to the monomer level and potentially further oxidation of the CBD monomers to enable solubilization. The processes of chain fragmentation and solubilization appear to have different temperature dependencies.

The oxidative degradability of PCBDT was benchmarked against PET. There is a marked difference in degradation behavior. The mass loss of PET sets in almost immediately upon exposure to hydrogen peroxide, but proceeds slowly and with constant (40° C.) or even increasing (20° C.) interfacial viscosity while no swelling is observed. Not wishing to be bound by theory, it is inferred that this gradual mass loss is due to a surface erosion process of the 2-3 nm thick film, in contrast to PCBDT which forms a true monolayer (0.3 nm thickness). This monolayer is much more susceptible to losing its shear modulus through chain cuts when compared to the thicker PET layer. The monomers and smaller fragments of PET are readily water-soluble, so the lag time for PET dissolution under oxidative conditions is very short compared to PCBDT. Altogether, PCBDT is more susceptible to hydrolytic degradation than PET, which is beneficial for environmental biodegradability or industrial depolymerization but shows slower mass loss under oxidative conditions.

Dielectric Properties and Capacitive Performance: The dielectric constant and dissipation factor for PCBDT and commercial PET as a function of temperature and frequency were studied. PCBDT demonstrates remarkable thermal stability of its dielectric constants, spanning the temperature range from 30° C. to 150° C., with a temperature coefficient of the dielectric constant of around −0.056% ° $C.^{-1}$ with respect to 30° C. at 1 kHz. This attribute is important for dielectrics, especially when applied in energy storage, where it ensures a stable output energy density in capacitors, thus underscoring the practical value of PCBDT. The commercial PET shows a temperature-dependent variability in its dielectric constants, especially when the temperature is close to its Tg. In comparison, the dissipation factors of PCBDT are within 1% across the temperature range spanning from 30° C. to 150° C. and frequencies ranging from 1 Hz to 10 kHz, while those of PET increase substantially when the temperature increases, especially at low frequencies, e.g., the dissipation factor can reach about 21% at 1 Hz under 150° C. The high loss and the drastic change of the dielectric constant are due to the a relaxation caused by the large-scale movement of the main chain. The linear chain in the backbone of PET is much more flexible when the temperature is higher than Tg, contributing to the large scale of movement of the main chain.

The high-field capacitive energy storage properties of PCBDT were evaluated at room temperature and 100° C. PCBDT demonstrates a competitive performance when compared to the widely used commercial capacitor polymer PET. At room temperature, PCBDT can deliver an impressive discharged energy density of approximately 8.0 $J/cm^3$ under 800 MV/m with a charge-discharge efficiency that is above 75%, which is close to the performance of PET. When the temperature increases to 100° C., although the charge-discharge efficiency of PCBDT drops when the electric field is increased to 300 MV/m, PCBDT shows a higher charge-discharge efficiency compared to PET in a higher field. For instance, under 760 MV/m, the efficiency is around 65% for PCBDT while that of commercial PET is 45%. Thus, PCBDT can reach a maximum discharged energy density of 7.3 $J/cm^3$ at 100° C., which is very close to the maximum discharged energy density of PET (7.5 $J/cm^3$). The Weibull statistic breakdown strength of PCBDT at 100° C. is 610 MV/m, close to that of PET (640 MV/m), as shown in, indicating the potential of PCBDT to be a bio-based alternative to PET dielectrics with virtually identical capacitive performance.

Conclusion: CBD is one of several naturally occurring cannabinoids that have a diol structure. The bifunctionality of the monomer aids in synthesizing different condensation polymers with tunable properties for various applications. Poly(cannabinoids), in general, showcase a fascinating alternative to producing new polymers from renewable sources. The high Tg of pCBDT is obtained by reducing the flexibility of the polymer backbone and increasing the rigidity of the side group. A large band gap is maintained because the change in the polymer structure did not increase the conjugation of the molecule. PCBDT exhibits stable dielectric constant, low dielectric loss, high breakdown strength, and well-balanced high-field charging-discharging properties. The hydrolytic degradability of pCBDT further promotes the recyclability of the polymer, which also shows good resistance to dissolution in oxidative environments. The life cycle of cannabinoid polymers for capacitive energy storage originate from hemp and *cannabis* biomass, isolation of cannabinoids, polymerization into polymers and films, processing into polymer dielectric capacitors, use of the capacitors for capacitive energy storage in a variety of applications (automotive, aerospace, etc.), chemical recycling of cannabinoids or environmental degradation.

Example 3. Printable Ink Prepared from a Polycannabinoid-Tungsten Composite

One example manifestation of a printable ink composition could consist of metal particles coated with a polycannabinoid (FIG. 4*a*). A sintering step would induce aggregation of the metal particles to make the composite conductive (FIG. 4*c*). The presence of the polycannabinoid in the space between the particles would prevent oxidation of the metal particles until the polycannabinoid is degraded. These metals could include but are not limited to copper, steel, and aluminum.

Degradable metals. Degradable electronics are beneficial for devices that degrade inside the body and devices that can degrade in the environment to create benign degradation products. Several metals are considered to be biodegradable, including Mg, Fe, Zn, Mo, and W and are used as conductors in degradable electronics. However, these metals are biodegradable precisely because they are reactive so that they can oxidize and degrade in water. In most applications, degradable electronics must remain fully functional (prevent an oxidation or reaction of electronic components) until the specified lifetime of the device, after which they should degrade. Polycannabinoids provide antioxidant properties that will inhibit unintentional oxidation until the polymer has degraded, at which point the metal will degrade. In this application, the antioxidant properties and tunable degradation rate are the key aspects of polycannabinoids that are being leveraged.

One specific example of a formulation is a composite that includes tungsten (W) microparticles in polycannabidiol (pCBD). The degradation rate of the pCBD is higher in more basic solution. Consequently, the W/pCBD composite could be fully degraded in an aqueous solution of ammonium hydroxide in only a few days. The degraded materials could then be reused to produce new polymers and composite materials.

This composite material was prepared by dissolving the surface oxide of W using ammonium hydroxide, followed by washing the W particles. A printable ink was formulated by mixing poly(cannabidiol adipate) with the W particles and a solvent. The volumetric content of W particles in the dry ink range from about 35% to 50%. After printing and drying, the inks exhibited a conductivity of >500 S/cm.

A composite of a polycannabinoid and tungsten (W) metal was formulated into a degradable ink because it is the most stable of the biodegradable metals. General reactivity of biodegradable metals starting with most reactive to least reactive: Cs>Rb>K>Na>Li>Ba>Ra>Sr>Ca>Mg>Be>Al>Ti>Mn>Zn>Cr>Fe>Cd>Co>Ni>Sn>Pb>Sb>Bi>Cu>W>Ag>Au>Pt. The status of metals within the body: Major elements—Ca, Mg, K, Na; Trace elements—Cr, Cu, Fe, Mn, Co, Mo, Ni, V, Zn, Li; Nonessential but useful elements—Sr, Sn, Ge; Nontoxic trace elements with unknown function—Al, Ba, Bi, Cs, Au, Rb, Ag, Zr, W.

However, W is considered as a trace element with unknown function in the body and unknown effect on the environment. Consequently, composites that include Fe, Zn, or Mo would be more appropriate for large implantable electronic devices and large devices that will degrade in the environment. The challenge with these metals is their high susceptibility to oxidation, which reduces the conductivity. The antioxidant properties of polycannabinoids could allow the preparation of stable composites of oxidizable metals such as Zn, Fe, and Mo. The ink preparation process described herein could be one method of preparing a composite that includes degradable metal particles.

Example 4. Emulsion Polymerization of Cannabinoid for High Performance Coating Applications Cannabidiol latex particles were prepared by emulsion polymerization. Emulsion polymerization of cannabidiol is feasible from the allylic double bond site in the structure. The final nanosized polymer particles called latex can be used for coating applications as it coalesces together by water evaporation to form a polymer film, a novel application of polymer made from cannabidiol.

The composition and reaction conditions of polyCBD-based latex particles are reported in Table 2.

TABLE 2

| |
|---|
| Monomer - CBD in Myrcene |
| Initiator - Water Soluble (ammonium persulphate) |
| Solvent - Water |
| Emulsifier - Surfactant (sodium dodecyl sulphate) |
| Buffer - pH (sodium bicarbonate) |
| Optional ingredients: |
| Defoamer/Anti foaming agent - 0.3-0.5% by weight |
| Freeze/thaw stabilizer/humectants - 0.5-0.8% by weight |
| Temp. - 70-80° C. |
| Particle Size - 20-40 nm |
| pH - 8-10 |
| Solids - 40-50% |

CBD-Myrcene Monomer Preparation: Take 1 g of CBD powder and add into 10 ml of myrcene. CBD powder instantly dissolves inside the myrcene. That is the CBD-myrcene monomer solution polyCBD-co-myrcene emulsion polymerization.

The procedure can be applicable for the preparation of CBG-Myrcene and other cannabinoid-Myrcene monomer solutions.

PolyCBD-co-Myrcene Emulsion Synthesis Procedure: Take 0.25 g of sodium dodecyl sulphate, 0.15 g of buffer and 25 ml of DI water in round bottom flask. Start stirring with a magnetic stirrer for 5 minutes and raise the temperature to 70-80° C. Provide an Argon blanket to the reaction. Subsequently, the CBD in myrcene solution was added in the mixture. Reaction was left for 20 minutes at 70-80° C. After that add thermal initiator ammonium persulphate in aqueous solution (0.035 g in 5 ml water). Run the reaction for 10 hours. After 10 hours, cool down the temperature and collect the emulsion.

The procedure can be applicable for the preparation of CBG-co-Myrcene and CBD-CBG-co-Myrcene polymer and other cannabinoid-co-Myrcene polymers.

PolyCBD latex particles copolymerized with any petroleum-based monomer (i.e. polyCBD-styrene-MMA). The above-described Emulsion Synthesis Procedure can be used with other petroleum-based monomers, where instead of myrcene, styrene and MMA mixture or styrene or MMA individually can be used to dissolve CBD and CBG. Examples of other suitable monomers besides myrcene include 1,3-butadiene, styrene, vinyl acetate, acrylates, methacrylates, and the like according to the following structure, or a combination thereof.

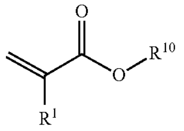

$R^{11}$=H or $CH_3$; $R^{10}$=C1-C10 alkyl, e.g. methyl, ethyl, n-butyl, hydroxyethyl, etc.

Polymer synthesis of CBD and CBG by emulsion polymerization to form polyCBD or poly CBG can form polymers of the following structures.

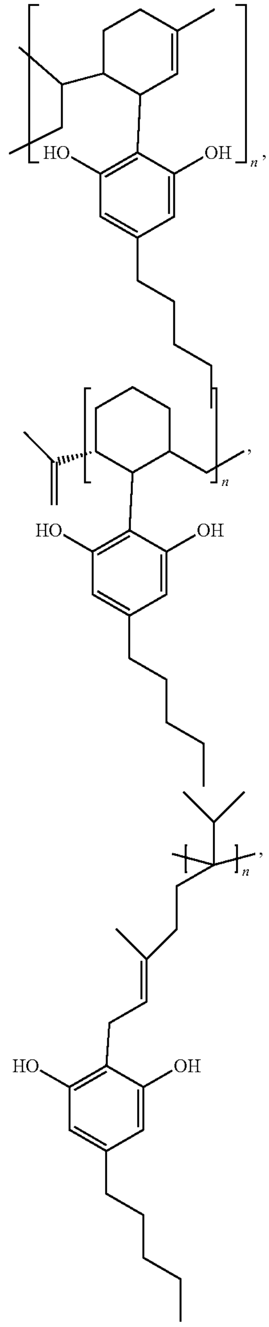

-continued

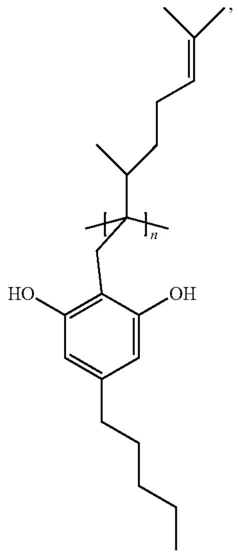

, or

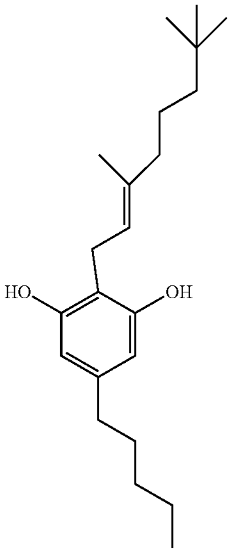

Polymerization of myrcene can form polymers of the following structures.

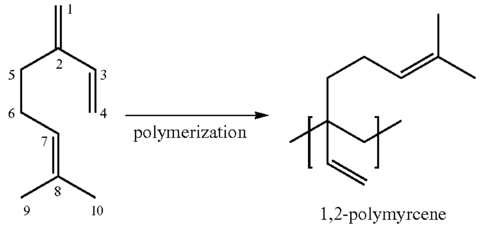

myrcene 1,2-polymyrcene

-continued

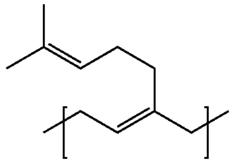

1,4-polymyrcene

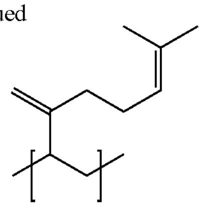

3,4-polymyrcene

Polymerization of styrene and MMA form polymers of the following structures.

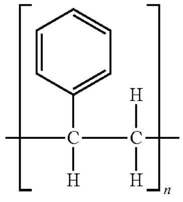

Polystyrene

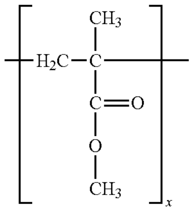

PMMA

Table 3 reports properties of the latex including Particle Size Distribution (PSD) by dynamic light scattering (DLS) which measures the hydrodynamic radius (RH).

TABLE 3

| Latex | pH | NVM (% wt.) | PSD (nm) | Tg(° C.) |
|---|---|---|---|---|
| Styrene: MMA | 9.51 | 25.45 | 26.6 | 110 |
| Myrcene | 5.03 | 16.36 | 35.0 | |
| Styrene: Myrcene | 8.85 | 6.36 | 19.8 | |
| MMA: Myrcene | 8.81 | 17.27 | | |
| CBD in Styrene: MMA | 9.05 | 35.45 | 28.3 | 100 |

PolyCBD cross-linked latex particles (i.e. polyCBD-diisocyanate, diacid): The above synthesized polyCBD latex particles can be further reacted with the diisocyanate (aromatic, aliphatic or alicyclic), diacid (aromatic, aliphatic, or alicyclic), or any epoxy functional groups. For example, the carboxyl and hydroxyl groups of BA-MMA-MAA can be cross-linked with cycloaliphatic diepoxide in a latex system. Similar types of cross-linking reaction and core shell structure could be made with CBD and CBG in myrcene/terpenes with various other functional monomers.

Materials and Methods for Examples 5-16: Cannabidiol (CBD) was purchased from EcoGen BioSciences and used as received. Cannabigerol (CBG) was purchased from Mile High Labs, Inc and used as received. All other chemicals were purchased from Sigma Aldrich and used without further purification unless otherwise noted. Unless otherwise indicated, $^{1}H$ NMR was collected using a Bruker AVANCE 500 MHz instrument. Thermo Gravimetric Analysis was conducted using a TA Instruments TGA Q-500 and DSC was collected using a TA Instruments DSC Q-20. GPC was taken using a WATERS GPC equipped with a 1515 HPLC Pump and Waters 717Plus Autoinjector. Ultra Performance Liquid Chromatograph tandem Mass Spectrometry (UPLC/MS/MS) was conducted using a Waters Acquity UPLC-TQD equipped with a PDA detector.

Example 5. Preparation of Sebacoyl Chloride

To a flame dried 25 mL round bottom flask was added 5 grams (24.7 mmol) of sebacic acid and 10 mL (137.8 mmol)

of thionyl chloride. A reflux condenser was added to the flask and the solution allowed to stir at 900 Celsius for 3 hours until all the solid acid had dissolved. After cooling to room temperature, excess thionyl chloride was removed under vacuum. Five mL of anhydrous toluene was added and removed under vacuum to further remove excess thionyl chloride. The clear yellow solution was further purified by vacuum distillation to yield a colorless oil (5 grams, yield 84.6%).

Example 5A. Preparation of Cannabidiol Polyester—Poly(Cannabidiol-Sebacate)

To a flame dried 25 mL three-neck round bottom flask, containing a solution of 10 mL anhydrous DCM and 5 mL of anhydrous Pyridine, 1 gram (3.2 mmol) of dry CBD was dissolved. Next, 0.68 mL of freshly made and distilled sebacoyl chloride (3.2 mmol) was added dropwise at room temperature over 10 minutes and the reaction allowed to stir at room temperature for 96 hours. The viscous solution was precipitated using dry-ice cold methanol. The solid was collected by filtering and dried under vacuum for 2 days to give 1.3 grams of white polymer; yield 81%. $^1$H NMR (400 MHz, $CDCl_3$): δ 6.68 (s, 2H), 5.20 (s, 1H), 4.54 (s, 1H), 4.46 (s, 1H), 3.51-3.45 (m, 1H), 2.69-2.27 (m, 7H), 2.20-1.97 (m, 2H), 1.89-1.47 (m, 16H), 1.46-1.40 (m, 12H), 0.87 (t, 3H).

Example 5B. Preparation of Cannabidiol Polyester—Poly(Cannabidiol-Sebacate)

20 mL of anhydrous methylene chloride (DCM) and 10 mL of anhydrous pyridine were added to a flame-dried 50 mL two-neck round bottom flask. 1.0 gram (0.00318 mol) of cannabidiol (CBD) was added to the solution and allowed to dissolve while stirring. The solution was then chilled to 0° C. in an ice-water bath. 0.68 mL (0.00318 mol) of Sebacoyl Chloride was then added dropwise over 30 minutes and the reaction stirred for 4 days. After some time, the solution turned from cloudy white to a transparent light-yellow. After the reaction finished, it was concentrated and precipitated in cold methanol to give white polymer strands (1.52 g, 86% yield). Mn 28k, PDI 1.52. $^1$H NMR (500 MHz, CDCl3): δ (ppm): 6.68 (s, 2H), 5.19 (s, 1H), 4.54 (s, 1H), 4.46 (s, 1H), 3.48 (s, 1H), 2.64 (t, 1H), 2.55-2.32 (m, 6H), 2.13 (m, 1H), 2.03-1.99 (m, 1H), 1.81-1.56 (m, 13H), 1.45-1.22 (m, 13H), 0.81 (t, 3H).

Example 6. Preparation of Cannabidiol Polyurethane

To a flame dried three-neck round bottom flask was added 1 gram (3.2 mmol) of dry CBD and 20 mL of anhydrous DCM. Next, 0.456 mL (3.2 mmol) of TDI (tolylene-2,4-diisocyanate) is added to the solution and stirred for 15 minutes. After stirring, 1 mL of a stock solution of DMAP in anhydrous DCM (2 mg/mL) was added to the flask. A reflux condenser was attached to the flask and the solution refluxed for 24 hours. After the reaction finished, the solution was quenched with dry-ice cold methanol. The solid was collected by filtering and dried under vacuum for 2 days to give 1.42 grams of white polymer; yield 84%.

Example 7. Preparation of Cannabidiol Polyester—Poly(Cannabidiol-Adipate)

[0149]80 mL of anhydrous methylene chloride (DCM) and 40 mL of anhydrous pyridine were added to a dried 250 mL two-neck round bottom flask. 10 grams (0.0318 mol) of cannabidiol (CBD) was added to the solution and allowed to dissolve while stirring. The solution was then chilled to 0° C. in an ice-water bath. 4.66 mL (0.0318 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (12.15 g, 90% yield). Mn 21k, PDI 1.63. $^1$H NMR (500 MHz, CDCl3): δ (ppm): 6.75 (s, 2H), 5.25 (s, 1H), 4.59 (s, 1H), 4.51 (s, 1H), 3.54 (d, 1H), 2.58 (m, 7H), 2.18 (m, 1H), 2.09 (m, 1H), 1.86-1.63 (m, 14H), 1.35 (m, 4H), 0.92 (t, 3H).

Example 8. Preparation of Cannabigerol Polyester—Preparation of Poly(Cannabigerol-Adipate)

80 mL of anhydrous methylene chloride (DCM) and 40 mL of anhydrous pyridine were added to a dried 250 mL two-neck round bottom flask. 10 grams (0.0316 mol) of cannabigerol (CBG) was added to the solution and allowed to dissolve while stirring. The solution was then chilled to 0° C. in an ice-water bath. 4.62 mL (0.0316 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (11.73 g, 87.6% yield). Mn 21k, PDI 1.61. $^1$H NMR (500 MHz, CDCl3): δ (ppm): 6.82 (s, 2H), 5.07 (m, 2H), 3.17 (m, 2H), 2.68-2.50 (m 6H), 2.07 (m, 2H), 1.99 (m, 2H) 1.90 (m, 4H), 1.77-1.57 (m, 11H), 1.36 (m, 4H), 0.93 (t, 3H).

Example 9. Preparation of Cannabigerol Polyester—Poly(Cannabigerol-Sebacate)

20 mL of anhydrous methylene chloride (DCM) and 10 mL of anhydrous pyridine were added to a dried 50 mL two-neck round bottom flask. 1.0 grams (0.0316 mol) of cannabigerol (CBG) was added to the solution and allowed to dissolve while stirring. The solution was then chilled to 0° C. in an ice-water bath. 0.67 mL (0.0316 mol) of Sebacoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (1.47 g, 83.4% yield). $^1$H NMR (500 MHz, CDCl3): δ (ppm): 6.75 (s, 2H), 5.07-5.01 (m, 2H), 3.12 (d, 2H), 2.59-2.48 (m, 6H), 2.02 (m, 2H), 1.93 (m, 2H), 1.77-1.69 (m, 4H), 1.68-1.57 (m, 10H), 1.44-1.25 (m, 13H), 0.88 (t, 3H).

Example 10. Preparation of Co-Polyester—Preparation of Poly(Cannabidiol-Co-Cannabigerol-Adipate)

20 mL of anhydrous chloroform ($CHCl_3$) and 10 mL of anhydrous pyridine were added to a flame-dried 50 mL two-neck round bottom flask. 1.258 grams (0.00398 mol) of cannabigerol (CBG) and 1.25 grams (0.00398 mols) of cannabidiol (CBD) was added to the solution and allowed to dissolve while stirring. The solution was then chilled to 0° C. in an ice-water bath. 1.165 mL (0.00795 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give white polymer strands (3.5 g, 88%. 3 yield). $^1$H NMR (500 MHz, CDCl3): δ (ppm): 6.77 (s, 2H), 6.70 (s, 2H), 5.20 (s, 1H), 5.04 (m, 2H), 4.55 (s, 1H), 4.46 (s, 1H), 3.52-3.43 (m, 1H), 3.12 (d, 2H), 2.66-2.38 (m, 13H), 2.19-2.07 (m, 2H), 2.06-1.98 (m, 3H), 1.89-1.71 (m, 10H), 1.69 (s, 3H), 1.65 (s, 6H), 1.62-1.52 (m, 9H), 1.35-1.23 (m, 8H), 0.92-0.81 (m, 6H).

Example 11. Preparation of Co-Polyester—Preparation of Poly(Cannabidiol-Co-Olivetol-Adipate)

20 mL of anhydrous chloroform ($CHCl_3$) and 10 mL of anhydrous pyridine were added to a flame-dried 50 mL two-neck round bottom flask. 1.25 grams (0.00398 mols) of cannabidiol (CBD) was added to the solution and allowed to dissolve while stirring. The solution was then chilled to 0° C. in an ice-water bath. 1.165 mL (0.00795 mol) of Adipoyl Chloride was then added dropwise over 30 minutes and the reaction stirred for 4 days. On day 3, the solution turned from cloudy white to a transparent light-yellow. After the reaction was finished, it was concentrated and precipitated in cold methanol to give brown polymer strands (3.5 g, 88%. 3 yield). $^1$H NMR (500 MHz, CDCl3): δ (ppm): 6.80 (s, 2H), 6.74 (m, 1H), 6.70 (s, 2H), 5.20 (s, 1H), 4.55 (s, 1H), 4.46 (s, 1H), 2.79-2.35 (m, 14H), 2.19-2.07 (m, 1H), 2.06-1.96 (m, 1H), 1.90-1.49 (m, 20H), 1.37-1.24 (m, 8H), 0.92-0.82 (m, 6H).

Example 12. Preparation of Cannabidiol Polyester—Poly(Cannabidiol-Terephthalate)

10 mL of anhydrous methylene chloride (DCM) and 10 mL of anhydrous pyridine were added to a flame-dried 50 mL two-neck round bottom flask. 1.0 grams (0.00318 mols) of cannabidiol (CBD) was added to the solution and allowed to dissolve while stirring. The solution was then chilled to 0° C. in an ice-water bath. Terephthaloyl Chloride (0.6456 grams, 0.00318 mols), dissolved in 10 mL of anhydrous DCM, was then added dropwise over 30 minutes and the reaction stirred for 4 days. After the reaction was finished, it was precipitated in cold methanol to give a white, flakey solid (1.45 grams, 88.1% yield).

Example 13. Preparation of Cannabigerol Polyester—Poly(Cannabigerol-Terephthalate)

10 mL of anhydrous methylene chloride (DCM) and 10 mL of anhydrous pyridine were added to a flame-dried 50 mL two-neck round bottom flask. 1.006 grams (0.00318 mols) of cannabigerol (CBG) was added to the solution and allowed to dissolve while stirring. The solution was then chilled to 0° C. in an ice-water bath. Terephthaloyl Chloride (0.6456 grams, 0.00318 mols), dissolved in 10 mL of anhydrous DCM, was then added dropwise over 30 minutes and the reaction stirred for 4 days. After the reaction was finished, it was precipitated in cold methanol to give a white, flakey solid (1.36 grams, 82.4% yield).

Example 14. Preparation of Cannabidiol-Diacetate 50 mL of anhydrous methylene chloride (DCM) and 6 mL of freshly distilled triethylamine (TEA) was added to a flame dried 100 mL two-neck round bottom flask. 5 grams (15.9 mmol) of cannabidiol (CBD) was added to the solution and dissolved while stirring. The solution was then chilled to 0° C. in an ice-water bath. Excess acetyl chloride (3.0 mL, 42 mmol) was added to the solution dropwise over 15 minutes. The reaction turned white, cloudy after addition of the acetyl chloride. After several hours, the solution became clear orange and was stirred for an additional 96 hours. After the reaction finished, the solvent was stripped using rotary evaporation, leaving crude orange oil. The oil was then redissolved in ethyl acetate, which precipitated protonated TEA salts. The mixture was filtered, and the liquid was washed with water (3×20 mL) and brine (3×20 mL). The aqueous washings were extracted with ethyl acetate (2×20 mL). Organic fractions were collected dried and concentrated using rotary evaporation to yield a viscous light-yellow oil. The oil was further purified using column chromatography using a 1:9 ratio of ethyl acetate to hexane. The product was concentrated using rotary evaporation and left to dry on a vacuum line overnight to give a viscous, colorless oil (5.97 g, 94% yield). 1H NMR (500 MHz, CDCl3): δ (ppm): 6.71 (s, 2H), 5.19 (s, 1H), 4.55 (s, 1H), 4.45 (s, 1H), 3.50 (d, 1H), 2.65 (td, 1H), 2.54 (t, 2H), 2.19 (m, 7H), 2.04-2.01 (d, 1H), 1.83-1.69 (m, 2H), 1.67 (s, 3H), 1.63-1.53 (m, 5H), 1.30 (m, 4H), 0.88 (t, 3H).

Example 15. Preparation of Cannabigerol-Diacetate 50 mL of anhydrous methylene chloride (DCM) and 6 mL of freshly distilled triethylamine (TEA) was added to a flame dried 100 mL two-neck round bottom flask. 5 grams (15.79 mmol) of cannabigerol (CBG) was added to the solution and dissolved while stirring. The solution was then chilled to 0° C. in an ice-water bath. Excess acetyl chloride (3.0 mL, 42 mmol) was added to the solution dropwise over 15 minutes. The reaction turned white, cloudy after addition of the acetyl chloride. After several hours, the solution became clear orange and was stirred for an additional 96 hours. After the reaction finished, the solvent was stripped using rotary evaporation, leaving crude orange oil. The oil was then redissolved in ethyl acetate, which precipitated protonated TEA salts. The mixture was filtered, and the liquid was washed with water (3×20 mL) and brine (3×20 mL). The aqueous washings were extracted with ethyl acetate (2×20 mL). Organic fractions were collected dried and concentrated using rotary evaporation to yield a viscous light-yellow oil. The oil was further purified using column chromatography using a 1:9 ratio of ethyl acetate to hexane. The product was concentrated using rotary evaporation and left to dry on a vacuum line overnight to give a viscous, colorless oil (5.74 g, 91% yield). 1H NMR (500 MHz, CDCl3): δ (ppm): 6.77 (s, 2H), 5.05 (m, 2H), 3.15 (d, 2H), 2.56 (t, 2H), 2.27 (s, 6H), 2.05 (m, 3H), 1.95 (m, 2H), 1.71 (s, 3H), 1.65 (s, 3H), 1.60 (m, 4H), 1.31 (m, 4H), 0.88 (t, 3H).

Example 16. Preparation of Poly(CBD-Adipate) Films 18 wt. % of CBD in 1,4-dioxane solution was prepared by using Thinky Planetary Centrifugal Mixer (rotation+revolution) for improved dissolution, uniformity, and degassing. Films were cast on glass substrate having a smooth surface, by using a motorized drawdown coater. The doctor blade was set to an initial casting thickness of 203 m.

All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Various other components may be included and called upon for providing for aspects of the teachings herein. For example, additional materials, combinations of materials and/or omission of materials may be used to provide for added embodiments that are within the scope of the teachings herein. Adequacy of any particular element for practice of the teachings herein is to be judged from the perspective of a designer, manufacturer, seller, user, system operator or other similarly interested party, and such limitations are to be perceived according to the standards of the interested party.

In the disclosure hereof any element expressed as a means for performing a specified function is intended to encompass any way of performing that function including, for example, a) a combination of circuit elements and associated hardware which perform that function or b) software in any form, including, therefore, firmware, microcode or the like as set forth herein, combined with appropriate circuitry for executing that software to perform the function. Applicants thus regard any means which can provide those functionalities as equivalent to those shown herein. No functional language used in claims appended herein is to be construed as invoking 35 U.S.C. § 112(f) interpretations as "means-plus-function" language unless specifically expressed as such by use of the words "means for" or "steps for" within the respective claim.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. When introducing elements of the present invention or the embodiment(s) thereof, the articles "a," "an," and "the" are intended to mean that there are one or more of the elements. Similarly, the adjective "another," when used to introduce an element, is intended to mean one or more elements. "Or" means "and/or." The suffix "(s)" as used herein is intended to include both the singular and the plural of the term that it modifies, thereby including one or more of that term (e.g., the film(s) includes one or more films). The terms "including" and "having" are intended to be inclusive such that there may be additional elements other than the listed elements. The term "exemplary" is not intended to be construed as a superlative example but merely one of many possible examples. Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the de-scribed elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "+10%" means that the indicated measurement can be from an amount that is minus 10% to an amount that is plus 10% of the stated value. "Optional" or "optionally" means that the subsequently described event or circumstance can or cannot occur, and that the description includes instances where the event occurs and in-stances where it does not. Unless defined otherwise, technical and scientific terms used herein have the same meaning as is commonly understood by one of skill in the art to which this invention belongs.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements de-scribed in an exemplary embodiment without departing from the scope of the various embodiments as set forth in the appended claims.

What is claimed is:

1. A composition, comprising:

a metal in particulate form; and a polycannabinoid;

wherein the polycannabinoid comprises a plurality of cannabinoid units, wherein the polycannabinoid has the formula:

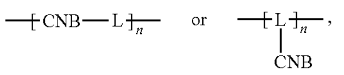

wherein:

CNB is a cannabinoid unit,

L is a linking group; and n represents the number of repeat units wherein n is at least 2;

wherein the linking group comprises a di-or tri-carboxylic acid linking group comprising citric acid, fumaric acid, glutamic acid, maleic acid, malic acid, terephthalic acid, isophthalic acid, naphthalene-2,6-dicarboxylic acid, oxaloacetic acid, phthalic acid, butanedioic acid, oxalic acid, malonic acid, succinic acid, glutaric acid, adipic acid, pimelic acid (heptanedioic acid), suberic acid (octanedioic acid), azelaic acid (nonanedioic acid), sebacic acid (decanedioic acid), undecanedioic acid, dodecanedioic acid, pyridine-2,6-dicarboxylic acid, 1H-imidazole-4,5-dicarboxylic acid, furan-2,5-dicarboxylic acid, furan-2,3-dicarboxylic acid, thiophene-2,5-dicarboxylic acid, thiophene-2,3-dicarboxylic acid, quinoline-2,4-dicarboxylic acid, cyclohexane-1,4-dicarboxylic acid, cyclopentane-1,3-dicarboxylic acid, cyclobutane-1,3-dicarboxylic acid, or bicyclo [2.2.2] octane-1,4-dicarboxylic acid, or a bifunctional compound such as

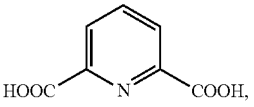

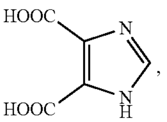

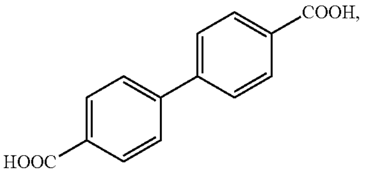

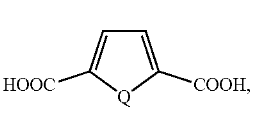

Q = O or S

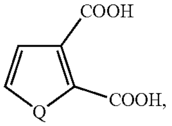

Q = O or S

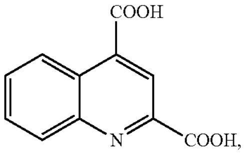

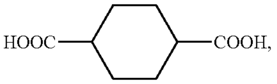

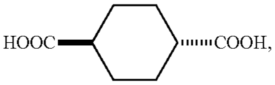

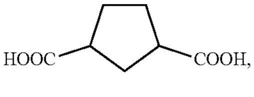

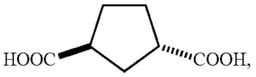

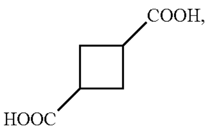

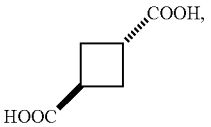

or

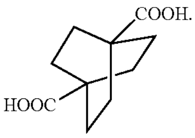

2. The composition of claim 1, wherein each cannabinoid unit is independently derived from CBG, CBD, CBC, CBND, dihydro-DHCBD, CBG-V, CBD-V, CBC-V, CBND-V, or dihydro-DHCBD-V; and wherein each cannabinoid unit is bound to the linking group via hydroxyl groups, acid groups, or ester groups on the cannabinoid unit before polymerization.

3. The composition of claim 1, wherein each cannabinoid unit has one of the following structures before polymerization:

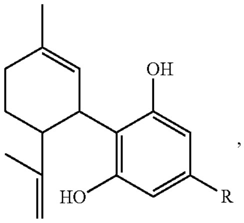

,

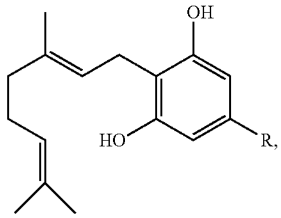

-continued

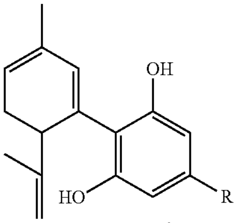

,

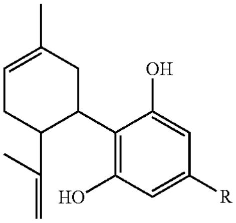

,

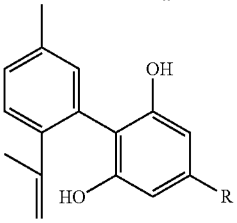

,

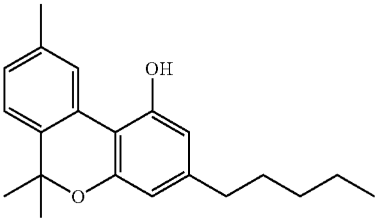

,

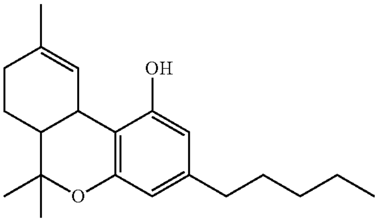

,

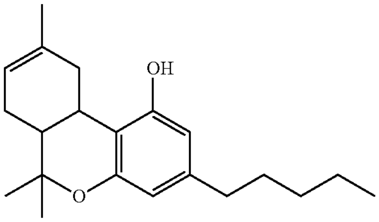

, or

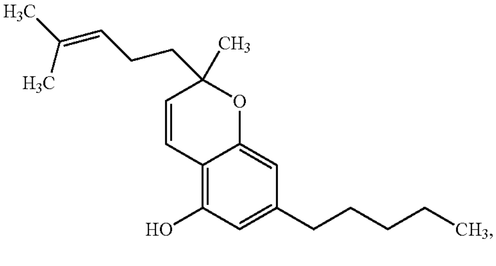

and wherein the R group is: $C_1$-$C_{10}$ alkyl optionally substituted with one or more heteroatoms, a heterocycloalkyl group, or a heteroaryl group.

4. The composition of claim 1, wherein the polymer further comprises a linear or branched hydrocarbon chain containing from 3 to 50 carbon atoms, optionally interrupted with one or more oxygen atoms or aromatic groups.

5. The composition of claim 1, wherein the polycannabinoid is poly (cannabidiol terephthalate) or poly (cannabidiol-adipate).

6. The composition of claim 1, wherein the metal is a transition metal or a post-transition metal.

7. The composition of claim 1, wherein the metal is biodegradable.

8. The composition of claim 1, wherein the metal is Ag, Al, Au, Ba, Be, Bi, Ca, Cd, Co, Cr, Cs, Cu, Fe, Ge, K, Li, Mg, Mn, Na, Ni, Pb, Pt, Ra, Rb, Sb, Sn, Sr, Ti, V, W, Zn, Zr, or a combination thereof.

9. The composition of claim 1, wherein the metal is Ag, Au, Fe, Cu, Ni, or W.

10. The composition of claim 1, wherein the metal is an oxidizable metal.

11. An article comprising the composition of claim 1.

12. The article of claim 11, wherein the article is a film, a biodegradable ink, an implantable device, a circuitry component, an electronic device, or a wearable biomedical monitoring device.

* * * * *